US012639839B2

(12) United States Patent
Murhed et al.

(10) Patent No.: US 12,639,839 B2
(45) Date of Patent: May 26, 2026

(54) METHOD AND ARRANGEMENTS FOR FORMING IMAGE DATA FOR USE IN 3D IMAGING OF AN OBJECT

(71) Applicant: SICK IVP AB, Linköping (SE)

(72) Inventors: Anders Murhed, Linköping (SE); Jens Edhammer, Linköping (SE); Andreas Öberg, Farsta (SE)

(73) Assignee: SICK IVP AB, Linköping (SE)

( * ) Notice: Subject to any disclaimer, the term of this patent is extended or adjusted under 35 U.S.C. 154(b) by 20 days.

(21) Appl. No.: 18/977,325

(22) Filed: Dec. 11, 2024

(65) Prior Publication Data

US 2025/0218016 A1    Jul. 3, 2025

(30) Foreign Application Priority Data

Jan. 2, 2024    (EP) .................................... 24150116

(51) Int. Cl.
*G06T 7/521*        (2017.01)
*G06T 7/514*        (2017.01)
            (Continued)

(52) U.S. Cl.
CPC .............. *G06T 7/521* (2017.01); *G06T 7/514* (2017.01); *G06T 7/586* (2017.01); *G06T 7/74* (2017.01);
            (Continued)

(58) Field of Classification Search
CPC ......... G06T 7/521; G06T 7/586; G06T 7/514; G06T 7/74; G06T 2207/10028; G06T 2207/10152
See application file for complete search history.

(56) References Cited

U.S. PATENT DOCUMENTS

2016/0078610 A1    3/2016  Rudd
2020/0124410 A1    4/2020  Haugen
                    (Continued)

FOREIGN PATENT DOCUMENTS

CN        108458670        8/2018
JP        2016-130663      7/2016
JP        2020-177017      10/2020

*Primary Examiner* — Thai Q Tran
*Assistant Examiner* — Jose M Mesa
(74) *Attorney, Agent, or Firm* — DUANE MORRIS LLP; Gregory M. Lefkowitz

(57)        ABSTRACT

Method and arrangements for forming image data for use in 3D imaging of an object (520). The image data being from an imaging system (505) based on light triangulation and that provides one or more illuminations (511) in one or more light planes that geometrically correspond to the same plane or parallel planes. The imaging system (505) and camera(s) (530) thereof are configured to image object points of the object (520) at least twice, according to a first imaging and second imaging, during illumination of the object points by said illumination(s). The first imaging and second imaging differing in how specular reflections caused by said illumination(s) are being imaged. First and second image data from the first and second imaging are obtained, corresponding first and second profile images (670) with common mapping to real world coordinates for intensity peaks (682, 683) caused by direct reflections from the object (520). Image data for use in the 3D imaging is formed (802) based on the obtained image data and excludes intensity peak data that for a respective object point imaged twice have intensity peak characteristics that differ between the first and second image data.

14 Claims, 13 Drawing Sheets

IMAGING1, ILLUMINATION1            IMAGING2, ILLUMINATION2

(51) Int. Cl.
    *G06T 7/586*         (2017.01)
    *G06T 7/73*          (2017.01)

(52) U.S. Cl.
    CPC ............... *G06T 2207/10028* (2013.01); *G06T 2207/10152* (2013.01)

(56)              References Cited

U.S. PATENT DOCUMENTS

| | | |
|---|---|---|
| 2020/0233484 A1 | 7/2020 | Thayer et al. |
| 2020/0334844 A1 | 10/2020 | Miyata et al. |
| 2021/0048341 A1* | 2/2021 | Johannesson ............ G01C 3/08 |
| 2022/0179083 A1* | 6/2022 | Wolke ...................... G06N 3/08 |

* cited by examiner

IMAGING1, ILLUMINATION1

IMAGING2, ILLUMINATION2

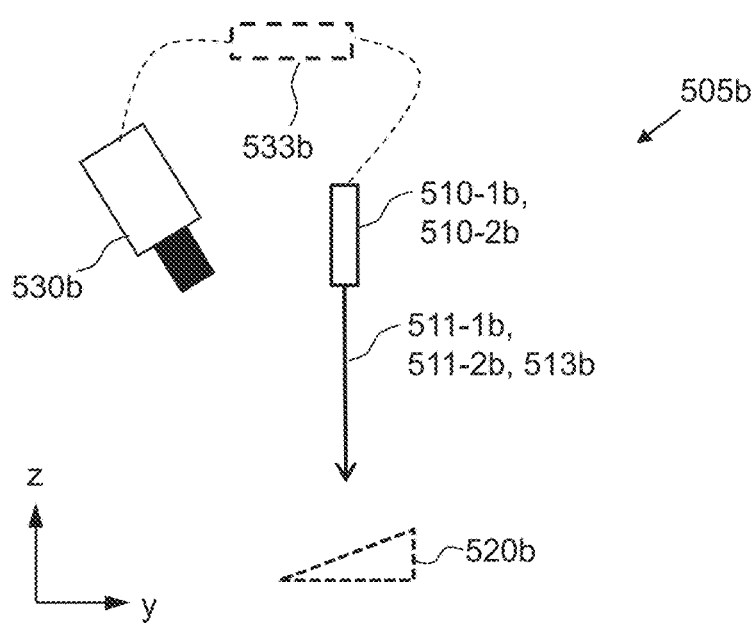
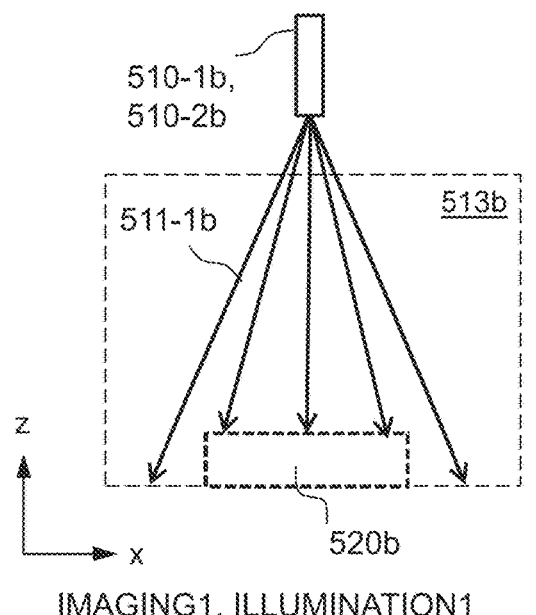
IMAGING1, ILLUMINATION1
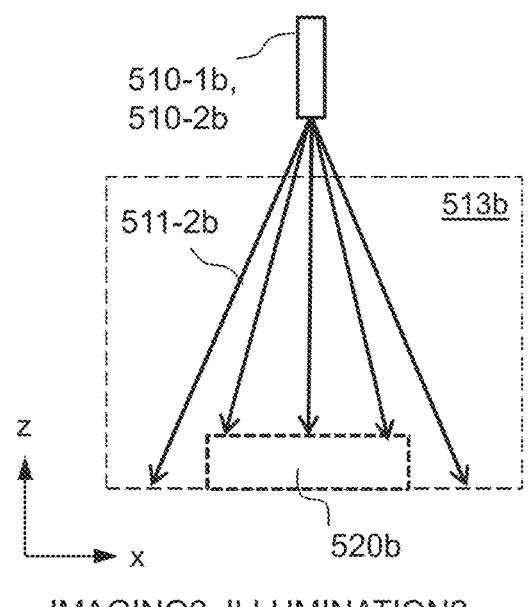
IMAGING2, ILLUMINATION2
FIG. 5B

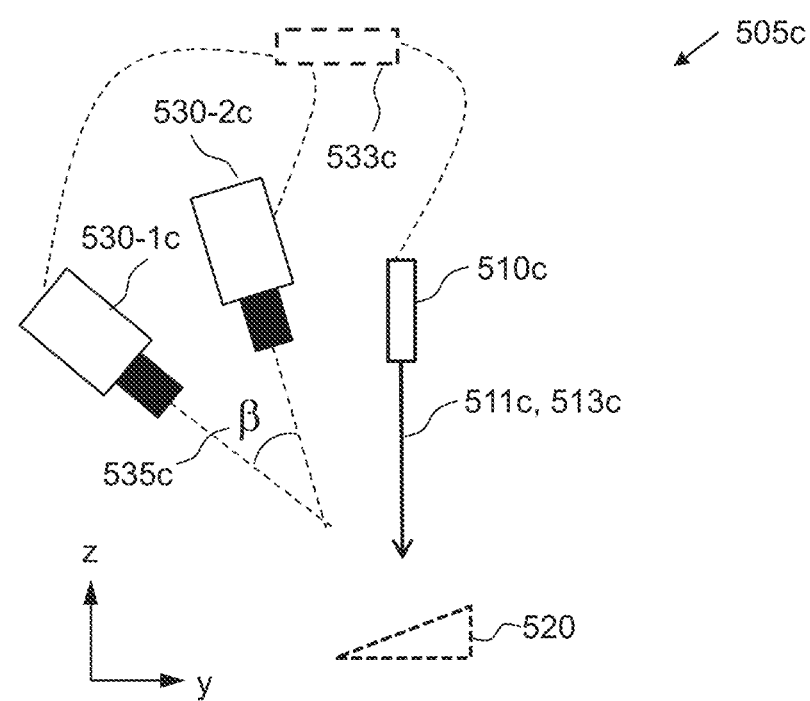
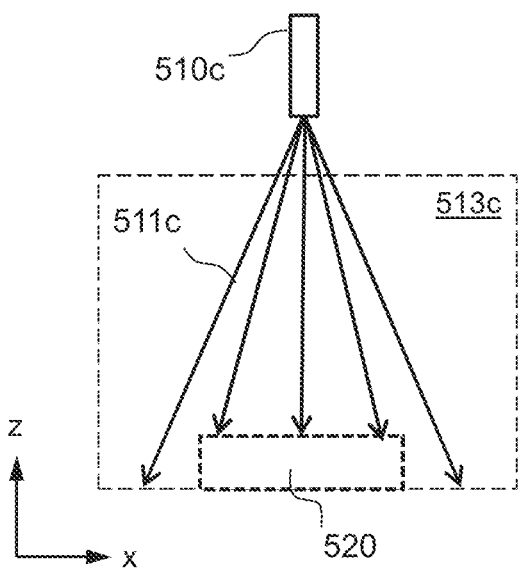
IMAGING1 WITH CAMERA VIEW ANGLE1, IMAGING2 WITH
CAMERA VIEW ANGLE2, SAME ILLUMINATION
FIG. 5C

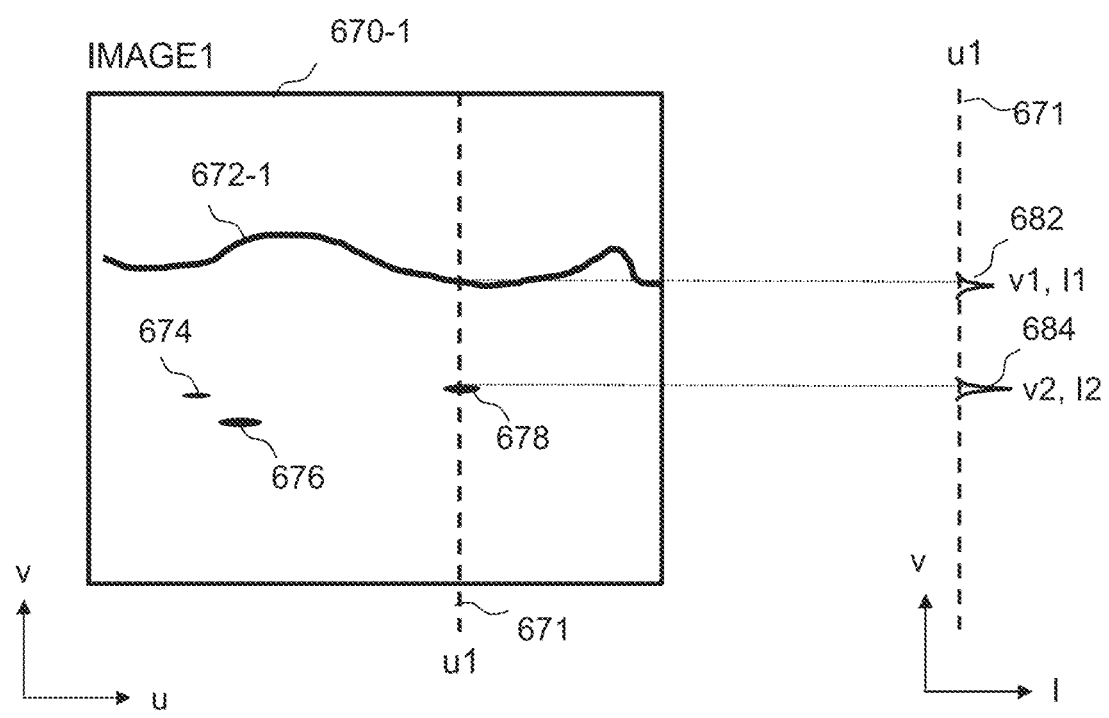
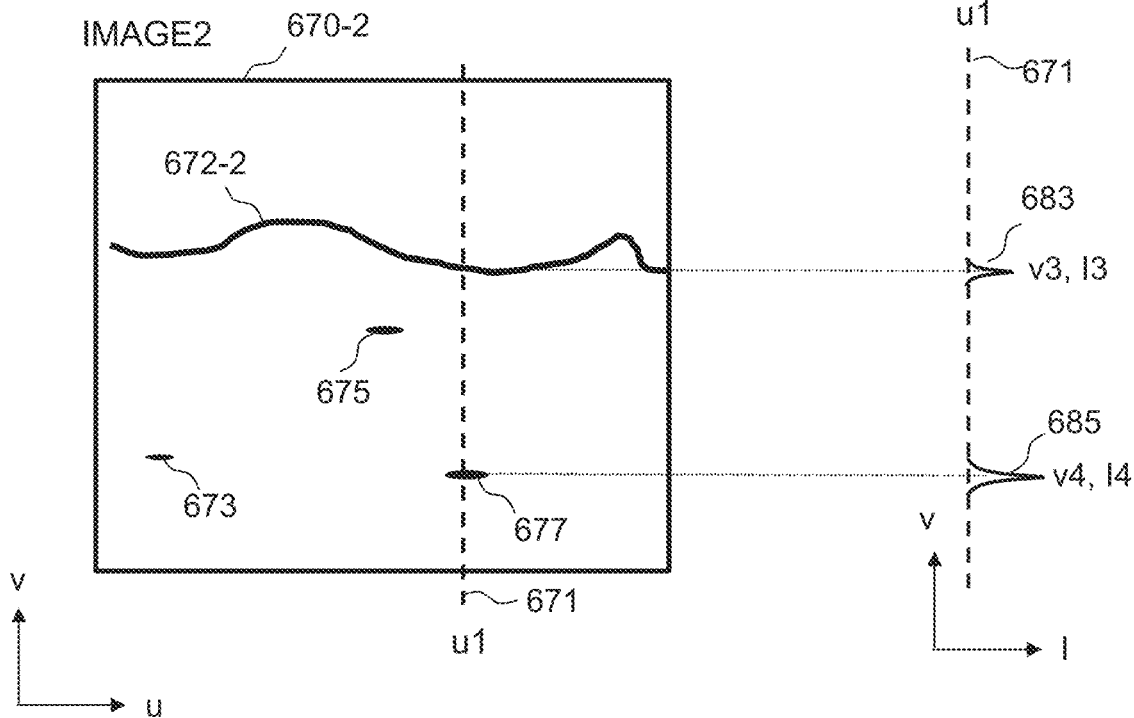
FIG. 6A

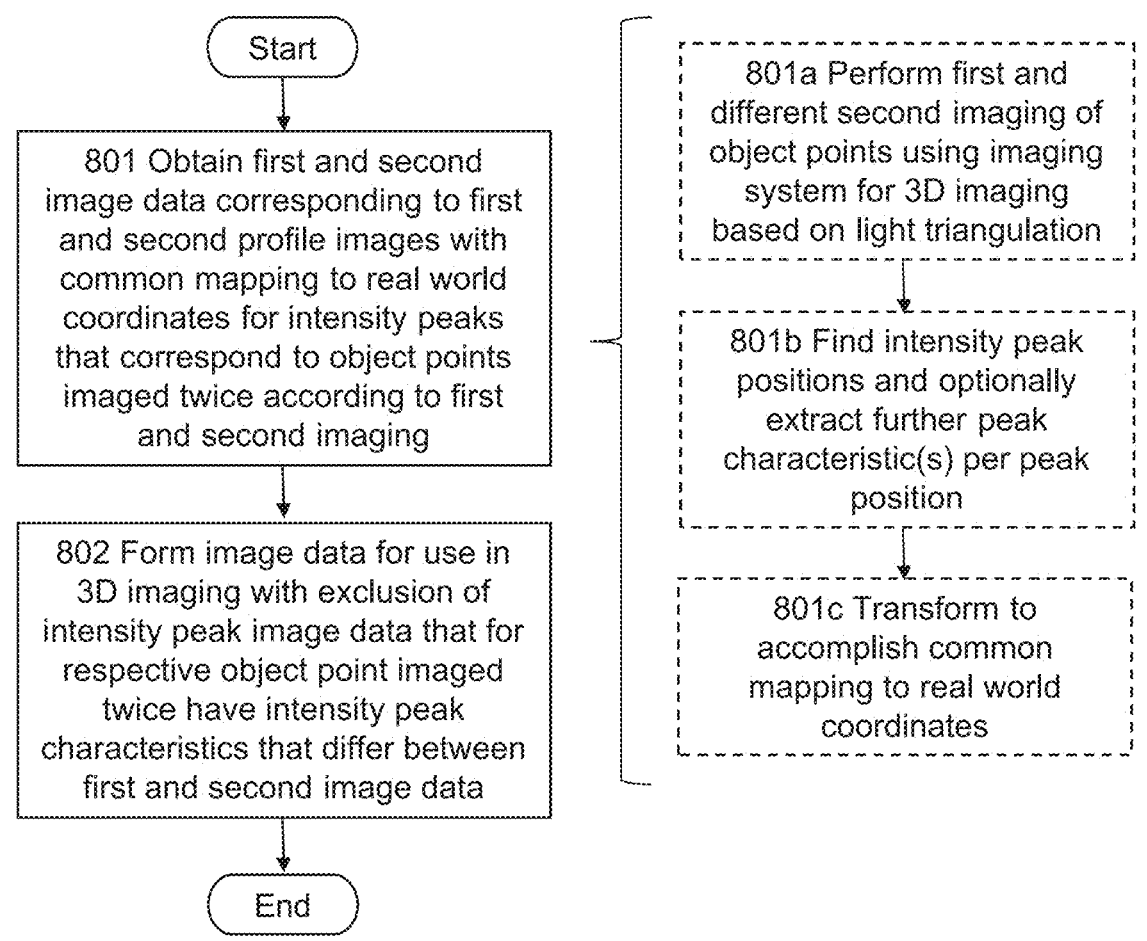

Start

801 Obtain first and second image data corresponding to first and second profile images with common mapping to real world coordinates for intensity peaks that correspond to object points imaged twice according to first and second imaging

802 Form image data for use in 3D imaging with exclusion of intensity peak image data that for respective object point imaged twice have intensity peak characteristics that differ between first and second image data

End

801a Perform first and different second imaging of object points using imaging system for 3D imaging based on light triangulation

801b Find intensity peak positions and optionally extract further peak characteristic(s) per peak position

801c Transform to accomplish common mapping to real world coordinates

FIG. 8A

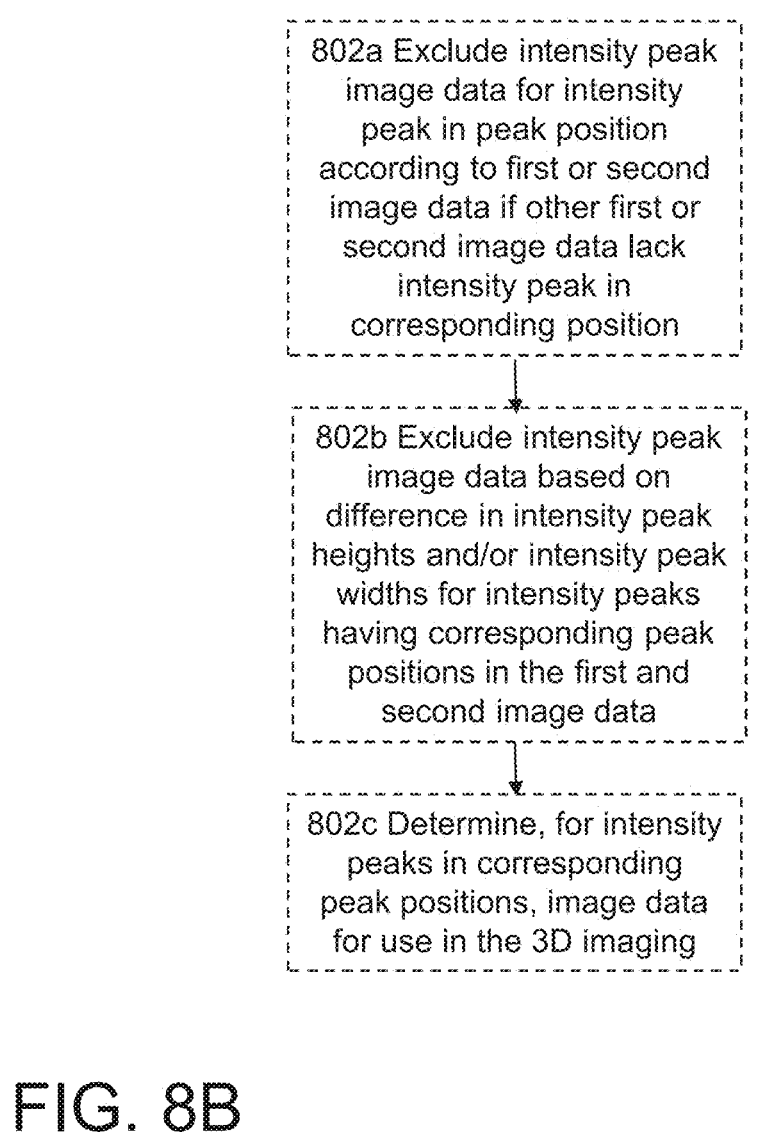

802a Exclude intensity peak image data for intensity peak in peak position according to first or second image data if other first or second image data lack intensity peak in corresponding position 802b Exclude intensity peak image data based on difference in intensity peak heights and/or intensity peak widths for intensity peaks having corresponding peak positions in the first and second image data 802c Determine, for intensity peaks in corresponding peak positions, image data for use in the 3D imaging

FIG. 8B

METHOD AND ARRANGEMENTS FOR FORMING IMAGE DATA FOR USE IN 3D IMAGING OF AN OBJECT

TECHNICAL FIELD

Embodiments herein concern a method and arrangements for forming image data for use in 3D imaging of an object, wherein said image data is from an imaging system based light triangulation for 3D imaging of the object.

BACKGROUND

Industrial vision cameras and systems for factory and logistic automation are often based on three-dimensional (3D) machine vision, where 3D-images of a scene and/or object are captured. By 3D-images is referred to images that comprise also "height", or "depth", information and not, or at least not only, information, e.g. intensity and/or color, regarding pixels in only two-dimensions (2D) as in a conventional image. That is, each pixel of the image may comprise such information associated with the position of the pixel in the image and that maps to a position of what has been imaged, e.g. the object. Processing may then be applied to extract information on characteristics of the object from the 3D images, i.e. 3D-characteristics of the object, and e.g. convert to various 3D image formats. Such information on height may be referred to as range data, where range data thus may correspond to data from height measurement of the object being imaged, or in other words from range or distance measurements of the object. Alternatively or additionally the pixel may comprise information on e.g. material properties such as relating to the scattering of the light in the imaged area or the reflection of a specific wavelength of light.

Hence, a pixel value may e.g. relate to intensity of the pixel and/or to range data and/or to material properties.

Line scan image data results when image data of an image is scanned or provided one line at a time, e.g. by camera with a sensor configured to sense and provide image data, one line of pixels at a time.

A special case of line scan image is image data provided by so called "sheet of light" or light plane, triangulation. Laser is often preferred but also other light sources can be used, e.g. light sources able to provide light that stays focused and do not spread out to much, that is, light that is "structured", for example light provided by a laser or Light Emitting Diode (LED).

3D machine vision systems are often based on such light triangulation. In such a system there is a light source illuminating the object with structured light corresponding to a specific light pattern, such as a light plane that results in a light, or laser, line on the object and along which line 3D characteristics of the object are captured, corresponding to a profile of the object. By scanning the object with such a line, i.e. performing a line scan, involving movement of the line and/or object, 3D characteristics of the whole object can be captured, corresponding to multiple profiles.

3D machine vision systems or devices based on light triangulation and for example uses a sheet of light for the light triangulation may be referred to as systems or devices for 3D imaging based on light, or sheet of light, triangulation, or simply laser triangulation when laser light is used.

Typically, to produce a 3D-image based on light triangulation, reflected light from an object to be imaged is captured by an image sensor of a camera and intensity peaks are detected in the image data. The peaks occur at positions corresponding to locations on the imaged object with the incident light, e.g. corresponding to a laser line, that was reflected from the object. The position in the image of a detected peak will map to a position on the object from where the light resulting in the peak was reflected.

A light or laser triangulating system, i.e. a 3D imaging system based on light triangulation, typically projects a light or laser line onto an object to create height curves from the surface of the object. By moving the object relative to the cameras and light sources involved, information on height curves from different parts of the object can be captured by images and then combined and used with knowledge of relevant geometries of the system to produce a three dimensional representation of the object, i.e. 3D image data is provided. This technique may be described as grabbing of images of the light, typically a laser line, when it is projected onto and reflected by the object and then, in the images, extract positions of the reflected light line. This is normally accomplished by identifying positions of intensity peaks in image frames e.g. using a conventional peak finding algorithm. Typically but not necessary the imaging system is setup so that intensity peaks can be searched for per column of the sensor and the position within the column maps to a height or depth.

Any measurement system, including 3D imaging system such as 3D machine vision systems mentioned above, can and typically result in artifacts, that may also be referred to as outliers, in resulting image data and 3D images based on the image data. Origin of artifacts are generally different and based on the measurement technique used and depend on the 3D imaging system used. There can be several different origins for the artifacts within the same system. Artifacts are by definition unwanted and can in industrial measurement applications make inspection task more difficult and sometimes impossible.

Artifacts can correspond to image data not correctly representing and/or corresponding to an actual point of a real word object that was imaged.

When a 3D imaging system is used to produce a 3D virtual object of an imaged real world object, a so called "point cloud" of image data may be provided, i.e. a set of image points that at least ideally should correspond to surface points of the 3D virtual object. The "point cloud" may be formed from or be based on such "height curves", or profile images, of the object as mentioned above, for example resulting from a 3D scan of the object by a light triangulation based 3D imaging system.

If the real world object is in a real world coordinate system x, y, z, the 3D virtual object may be in a corresponding virtual coordinate system x', y', z'. Artifacts may manifest in the point cloud as points that do not correspond to an actual real point on the surface of the real world object, i.e. the artifacts correspond to erroneous points, and typically visualize as "spikes" on the virtual object if the virtual object is drawn up based on a point cloud formed from image data comprising artifacts.

Artifacts as above may be due to different reasons and be formed for different reasons and during different steps performed to accomplish the 3D imaging. Hence, artifacts can also be avoided, removed and/or reduced in various ways and during different steps. In case of light triangulation as described above, artifacts can for example be reduced in connection with imaging, intensity peak finding and/or by operations on 3D image data before or after the peak finding.

In any case, artifacts not removed by earlier steps will in the end undesirably be present in the image data, for example corresponding to a "point cloud", that is used to visualize the object in 3D and/or to extract 3D related information about the object.

SUMMARY

In view of the above, an object is to provide one or more improvements or alternatives to the prior art, such as providing improvements regarding image data for use in 3D imaging of an object, particularly regarding reduction of artifacts in the image data and when the image data has been generated by an imaging system based light triangulation for 3D imaging of the object.

According to a first aspect of embodiments herein, the object is achieved by a method for forming image data for use in 3D imaging of an object. Said image data being from an imaging system based on light triangulation for 3D imaging of the object. Said imaging system comprising at least one camera and at least one light source for provision of one or more illuminations in one or more light planes that geometrically correspond to the same plane or parallel planes. Said imaging system and said at least one camera being configured to image object points of the object at least twice, according to a first imaging and second imaging, during illumination of the object points by said one or more illuminations and in accordance with the light triangulation. Said first imaging and second imaging differing from each other in how specular reflections caused by said one or more illuminations are being imaged. It is obtained first image data, comprising at least positions of intensity peaks resulting from said first imaging of object points by the imaging system. It is also obtained second image data, comprising at least positions of intensity peaks resulting from said second imaging of the object points by the imaging system. Said first and second image data correspond to first and second profile images, respectively, with common mapping to real world coordinates for intensity peaks caused by direct reflections from the object in accordance with the light triangulation. Said image data for use in the 3D imaging of the object is formed based on said obtained first and second image data, wherein said forming excludes intensity peak data that for a respective object point of said object points imaged twice have intensity peak characteristics that differ, or differ more than a certain extent, between the first and second image data.

According to a second aspect of embodiments herein, the object is achieved by a computer program comprising instructions that when executed by one or more processors causes one or more devices to perform the method according to the first aspect.

According to a third aspect of embodiments herein, the object is achieved by a carrier comprising the computer program according to the second aspect.

According to a fourth aspect of embodiments herein, the object is achieved by one or more devices for forming image data for use in 3D imaging of an object. Said image data being from an imaging system based on light triangulation for 3D imaging of the object. Said imaging system comprising at least one camera and at least one light source for provision of one or more illuminations in one or more light planes that geometrically correspond to the same plane or parallel planes. Said imaging system and said at least one camera being configured to image object points of the object at least twice, according to a first imaging and second imaging, during illumination of the object points by said one or more illuminations and in accordance with the light triangulation. Said first imaging and second imaging differing from each other in how specular reflections caused by said one or more illuminations are being imaged. Said one or more devices being configured to obtain first image data, comprising at least positions of intensity peaks resulting from said first imaging of object points by the imaging system. Said one or more devices being configured to also obtain second image data, comprising at least positions of intensity peaks resulting from said second imaging of the object points by the imaging system. Said first and second image data corresponding to first and second profile images, respectively, with common mapping to real world coordinates for intensity peaks caused by direct reflections from the object in accordance with the light triangulation. Said one or more devices being further configured to form said image data for use in the 3D imaging of the object based on said obtained first and second image data, wherein said forming excludes intensity peak data that for a respective object point of said object points imaged twice have intensity peak characteristics that differ, or differ more than a certain extent, between the first and second image data.

A principle that the above and embodiments herein are based on, is that if object points are imaged at least twice under circumstances as above, intensity peak characteristics regarding the same object point in the first and second image data, caused by wanted direct, typically diffuse, reflections in accordance with the light triangulation, will not differ, or differ to a much lesser extent compared to intensity peak characteristics resulting from unwanted reflections, such as caused by second and higher specular reflections.

For example, difference in illumination between the first and second imaging will affect specular reflections more than diffuse reflections and/or a difference in camera view angles (corresponding to different viewpoints) for the first and second imaging will result in greater differences for specular reflection(s) than for diffuse reflections.

The exclusion will remove intensity peak image data corresponding to artifacts, particularly artifacts in the form of intensity peak image data caused by unwanted, but hard to avoid, specular reflections from the imaging. The formed image data enable higher quality 3D imaging of the object with less artifacts than else would be present.

BRIEF DESCRIPTION OF THE DRAWINGS

Examples of embodiments herein are described in more detail with reference to the appended schematic drawings, which are briefly described in the following.

FIGS. 5A-C are schematic examples of imaging systems 305 for carrying out and implementing embodiments herein.

FIGS. 6A-B schematically illustrates example results from first and second imaging as in embodiments herein.

FIG. 8 is a flowchart for schematically illustrating embodiments of a method according to embodiments herein.

FIG. 9A shows result from a conventional prior at solution as in FIG. 4 and FIG. 9B shows improved result when embodiments herein have been applied.

DETAILED DESCRIPTION

Embodiments herein are exemplary embodiments. It should be noted that these embodiments are not necessarily mutually exclusive. Components from one embodiment may be tacitly assumed to be present in another embodiment and it will be obvious to a person skilled in the art how those components may be used in the other exemplary embodiments.

To enable better understanding of the technology, the prior art situation and problems indicated above in the Background, these will be further elaborated upon before embodiments herein are described.

Figure 1:
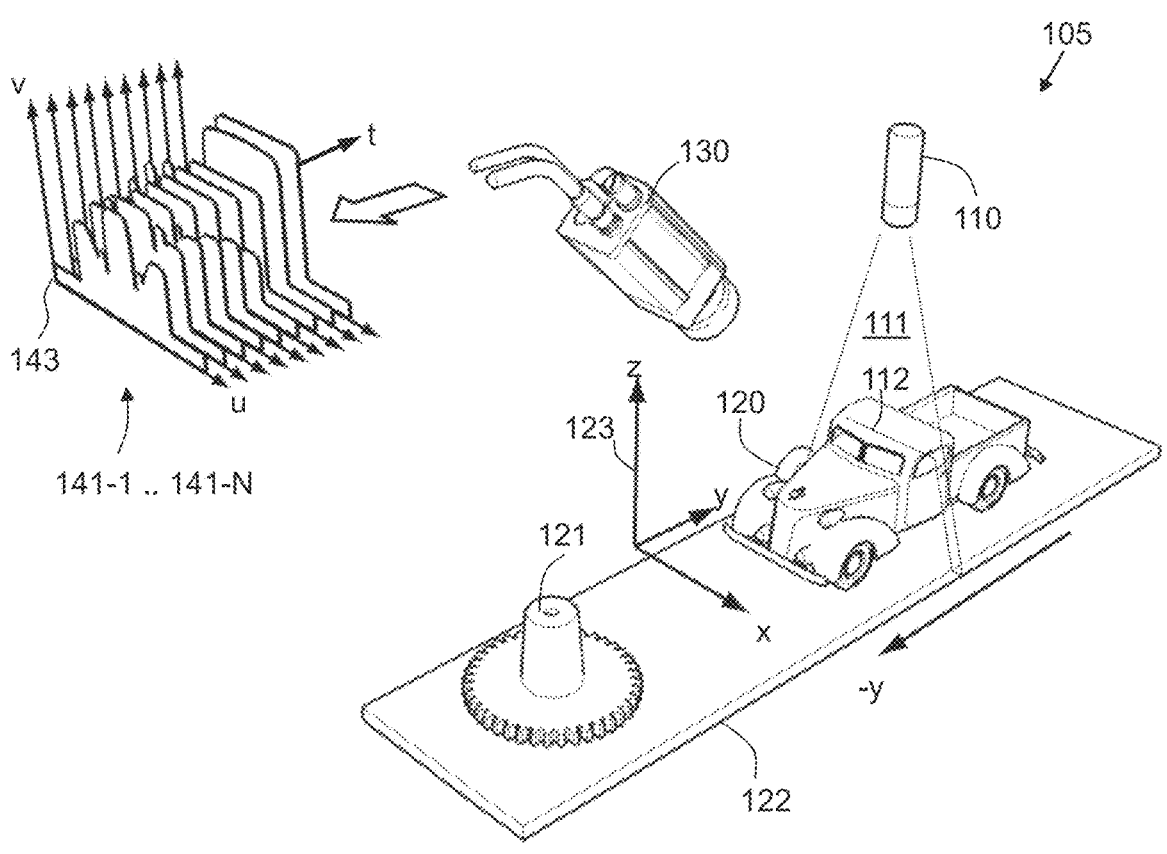
FIG. 1 schematically illustrates an example of a prior art 3D imaging system based on light triangulation, and that also embodiments herein can be based on after some adjustments.

FIG. 1 schematically illustrates an example of a prior art imaging system 100 for 3D imaging based on light triangulation that embodiments herein may be based on. The imaging system 100 may alternatively for example be named an imaging system for 3D machine vision based on light triangulation for capturing information on 3D characteristics of objects. The imaging system 100 is in the figure shown in a situation of normal operation, that is, typically after calibration has been performed and the system is thus calibrated. The imaging system 100 is configured to perform light triangulation, here in the form of sheet of light triangulation, that is, light triangulation where the structured light being a light plane is used. The imaging system 100 further comprises a light source 110, such as a laser, for illumination of objects to be imaged with structured light, typically a specific light pattern. In the example and figure there is structured light 111 in the form of a light plane. The light may, but not need to be, laser light, it may alternatively for example be light from one or m more Light Emitting Diodes (LEDs). Another example of structured light that is similar to but not what conventionally is a light plane but with similar effect, is a light edge, that is, an edge of an area with illumination. The generated light and illumination is typically provided through one and more lenses, for example in order to focus the light. Moreover, the camera is typically configured and located so that it, based on the so called Scheimpflug principle or Scheimpflug focusing, will have a focus plane co-located with, in other words, aligned, with the structured light 111, typically light plane. This way object reflections that occur in the light plane will be in focus in the image sensor. In the shown example, the objects subject to the imaging are exemplified by a first object 120 in the form of a car and a second object 121 in the form of a gear wheel construction. The objects that are imaged may be referred to as measure objects. When the structured light 111 is incident on an object, this corresponds to a projection of the structured light 111 on the object, which may be viewed upon as the structured light 111 intersects the object. For example, in the shown example, the structured light 111 in the form of the light plane results in a light line 112 on the first measure object 120. The structured light 111 is reflected by the object, more specifically by portions of the object at the intersection, that is, at the light line 112 in the shown example. The imaging system 100 further comprises a camera 130 comprising an image sensor (not shown in FIG. 1). The camera and image sensor are arranged in relation to the light source 110 and the objects to be imaged so that the structured light 111, when reflected by the objects, become incident on the image sensor. The image sensor is an arrangement, typically implemented as a chip, for converting incident light to image data. Said portions of the object, which by reflection causes said incident light on the image sensor, may thereby be captured by the camera 130 and the image sensor, and corresponding image data may be produced and provided for further use. For example, in the shown example, the structured light 111 will, at the light line 112 on a portion of the car roof of the first object 120, be reflected towards the camera 130 and image sensor, which thereby may produce and provide image data with information about said portion of the car roof. In accordance with the principle of light triangulation, with knowledge of the geometry of the imaging system 100, for example how image sensor coordinates relate to world coordinates, such as coordinates of a coordinate system 123, such as Cartesian coordinates, relevant for the object being imaged, the image data may be converted to information on 3D characteristics, for example in the form of a 3D shape or profile, of the object being imaged in a suitable format. The information on said 3D characteristics may comprise data describing 3D characteristics in any suitable format.

By moving the light source 110 and/or the object to be imaged, such as the first object 120 or the second object 121, so that multiple portions of the object are illuminated and cause reflected light sensed in images by the image sensor, in practice typically by scanning the objects with the structured light 111, image data describing a more complete 3D shape of respective object may be produced, for example corresponding to multiple, consecutive, profiles of respective object, such as the shown profile images 140-1-140-N of the first object 120. Each profile image shows a contour of the first object 120 where the structured light 111 was reflected when the image sensor of the camera unit 130 sensed the light resulting in the profile image. As indicated in the figure, a movable object support structure 122, such as a conveyor belt or similar, may be used to move, and thereby scan, objects through the structured light 111, with the light source 110 and the camera unit 130 typically stationary. Alternatively the structured light 111 may be moved over the object so that all portions of the object, or at least all portions facing the light source 110, are illuminated and the camera receives light reflected from all parts of the object desirable to image.

As understood from the above, respective image, corresponding to an image frame, provided by the camera 130 and its image sensor, for example during imaging of the first object 120, may correspond to, or be used to provide, any one of the profile images 140-1-140-N. Each position of the contour of the first object shown in any of the profile images 140-1-140-N are typically determined based on identification of intensity peaks in image data captured by the image sensor and on finding the positions of these intensity peaks. The imaging system 100 and conventional peak finding algorithms are typically configured to, in each image frame, search for an intensity peak per pixel column. If sensor coordinates are u, v and for example u, as indicted in the figure, corresponds to pixel positions along rows in the image sensor and v corresponds to pixel positions along columns, there is for each position u of an image frame searched for peak position along v and the identified peaks in an image frame may result in one such "clean" profile image as shown in the figure, and the total of image frames and profile images can be used to create a 3D image of the first object 120.

Figure 2:
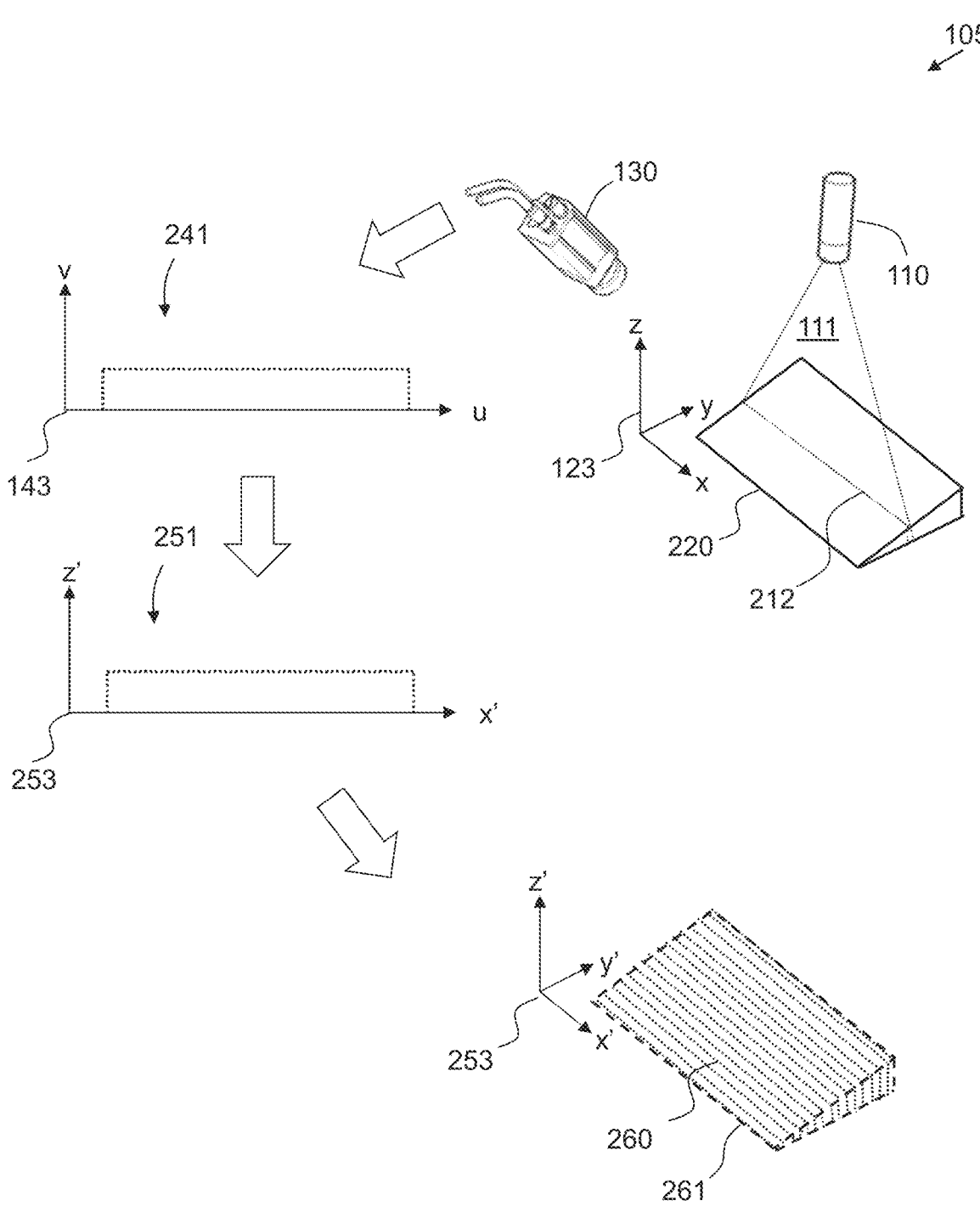
FIG. 2 schematically illustrates a simplified example of how a point cloud can be generated by means of a 3D imaging system as in FIG. 1.

FIG. 2 schematically illustrates a further simplified example of how a "point cloud", i.e. a set of surface points of a 3D virtual object can be generated by means of a 3D imaging system as in FIG. 1.

A wedge shaped measure object 220 is used in this example. Except for the measure object 220, the image system 105 may be as in FIG. 1. When an image has been captured by the image sensor of the camera 130 imaging a light line 212 positioned on the measure object 220 as shown in the figure, and intensity peaks identified, the result may be points at image sensor coordinates u, v as shown in the figure corresponding to a profile image 241. The light line is the result of the structured light 111, in the form of a light plane, projected on the measure object 220. The projection is on a profile of the measure object 220 and thus the light line, that corresponds to illumination by the structured light, illumi- nates object points of the profile that that are imaged. And results in said object profile 241 In the example, object points correspond to samples of the surface of the measure object 220, i.e. the object points correspond to surface points. Note that points are drawn here instead of lines connecting the points as is the case for the profile images 141-1.141-N in FIG. 1. Each point is at an intensity peak position that map to an object point on the object surface in accordance with the light triangulation. With knowledge of the geometry of the system 105 and setup used, how image sensor coordinates in u, v, and the time t when an image was captured by the sensor, relate to real world coordinates x, y, z, the points, or rather the positions of the points in coor- dinates u, v, t, such as in the sensor based coordinate system 143, can be converted to respective positions in a 3D virtual coordinate system x', y', z'. When the complete measure object 220 has been images, such as scanned by the light line 212, the result can thus be such set of points, i.e. a "point cloud", 260 as shown in the figure. In the shown example, the set of points 260 thus corresponds to samples of the surface of the measure object 220 and can be used to for example draw a corresponding virtual object. The contours of the virtual object have been indicated by a dotted line 261 in the figure to facilitate understanding that the set of points 260 corresponds to the measure object 220.

In practice and reality, however, with typically geometri- cally more complex objects and tricky, for example highly reflective, surface portions, etc., it may be difficult to accom- plish such perfect "point cloud" as in the figure that more or less perfectly represents the actual object surface. Instead there will be artifacts as mentioned above, often manifesting as "spikes" in a rendered 3D image from a "point cloud" with some point being artifacts. Some artifacts are due to that "incorrect" intensity peaks have been used, for example such that are captured in images provided by the imaging system, and used as if they were correct although the peak is not mapping to an object point on the object's surface in accordance with the light triangulation.

Figure 3:
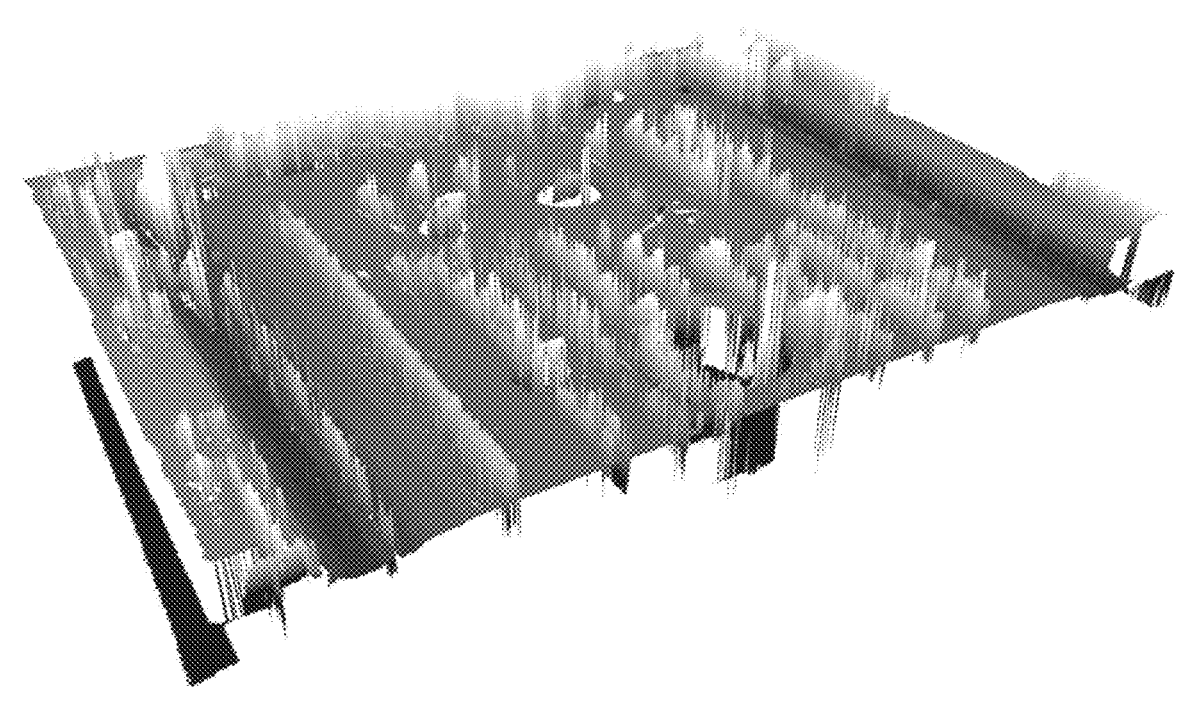
FIG. 3 shows a snapshot of a real world 3D image, based on prior art method, of an Aluminum mold for a mobile phone shell as object, where several artifacts in the form of "spikes" can be seen.

FIG. 3 shows an example from reality, a snapshot of a 3D image of an Aluminum mold for a mobile phone shell, resulting from imaging by an imaging system for 3D imag- ing based on light triangulation, such as discussed above.

The 3D image is resulting from a "point cloud" based on image data from the imaging system, where intensity peaks have been identified in a conventional manner and then the image has been rendered from the points of the "point cloud". As can be seen, there are several artifacts in the form of "spikes". Most of them are due to that the real object that was imaged, in addition to being rather geometrically com- plex, also contained highly reflective metal parts. As a result, a relative large amount of second and higher order specular reflections are present and captured by the scan of the object and in the resulting image data. These reflections manifest as undesired intensity peaks in the image data, in addition to the desired intensity peaks resulting from direct diffuse reflection from the object surface in accordance with the light triangulation. Highly reflective object surfaces, or object surface portions, causing a lot of first and higher order specular reflections, during imaging typically manifest in many artifacts in the image, such as the "spikes" that can be seen here. It is difficult by conventional methods to know which intensity peaks are the desired or wanted, "correct", ones, corresponding to direct, first order, typically diffuse, reflections from the object surface, and which intensity peaks are the undesired or unwanted, "incorrect" ones, resulting from for example second order and higher order specular reflections. An "incorrect" peak may therefore be treated as it was "correct" and be used in the 3D imaging where it may manifest as a "spike" since it maps to a point that does not correspond to a an actual object point on the object surface.

Figure 4:
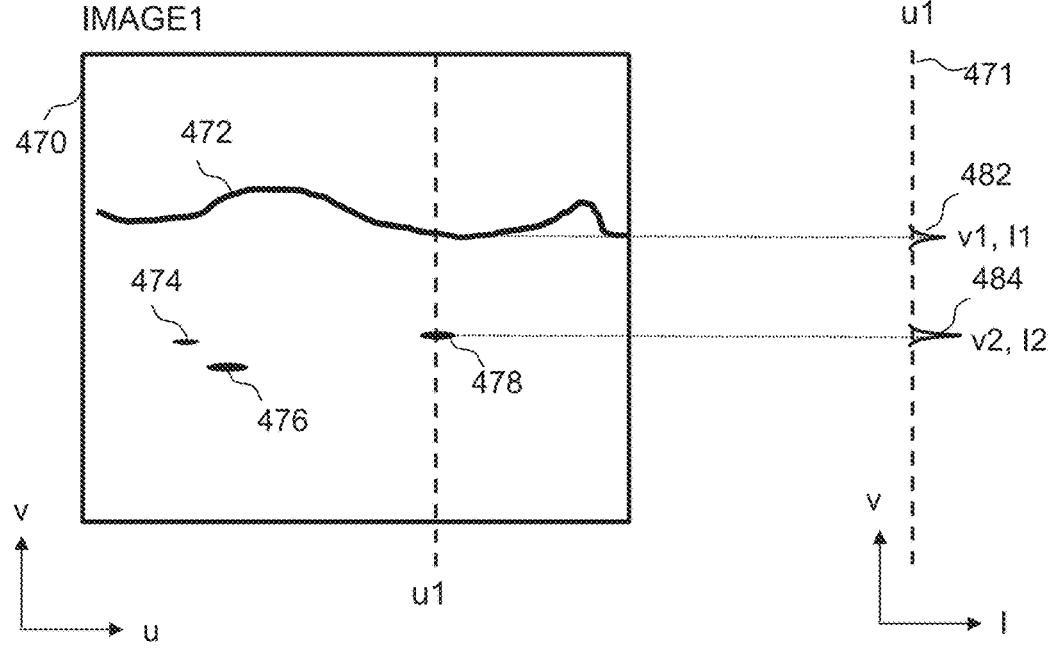
FIG. 4 is a schematic drawing for illustrating the prior art situation and problems from a peak finding perspective.

FIG. 4 is a schematic drawing for illustrating the prior art situation and the problems discussed above from a peak finding perspective. The example will also be "reused" further below when discussing embodiments herein.

An image 471, named IMAGE1, is shown, and corre- spond to an image as sensed by an image sensor of a camera in a imaging system for 3D imaging based on light trian- gulation, for example image sensor of the camera 120 in the examples above. Positions in the image 471 are in image sensor coordinates u, v, as in the examples above. The image 470 thus comprise sensed light where some light are direct reflections from the object surface in accordance with the light triangulation. In the image 471 this light correspond to a light portion 472 that thus correspond to light that has been projected on and directly been reflected from the object surface towards the camera and sensed by the image sensor. The light portion 472 thus capture information about a profile of the object in accordance with the light triangula- tion and as discussed above. Note that the light portion 472 and corresponding object profile is just an arbitrary example, no actual object having such profile is shown herein. The light portion 472 could for example alternatively look like one of the profiles 141 or the profile 241 in FIGS. 1 and 2. I any case, positions of the reflected light 472 in the coordinates u,v, and that map to object points that reflected the light, can be found by finding intensity peaks in the v-direction per column u. Note that it is not necessary to search along columns although this is simplest and imaging systems and coordinates systems are typically setup so that this is facilitated. A practical implementation benefits when it is able to operate per column. Alternatively and theoreti- cally, any other direction on the image sensor that map to a direction that intersect the object's surface may be used to search for intensity peaks, that is, along parallel pixel lines in such direction instead of along columns, such as diago- nally.

In any case, there should here at most be one intensity peak per column that is a "correct" one. However, for reason mentioned above, image 470 may have captured further light as well, exemplified by light portions 474, 476, 478 in the image 470, for example light resulting from second or higher order specular reflections. There may thus, in practice, just as in the shown example, along a column, such as column 471, named u1 in the figure, occur several separated portions with light. As can be seen in the shown example, the column 471 intersects both the "wanted" light portion 472 and the light portion 478. In practice there may occur several intensity peaks along respective column. In the figure, the intensity peaks along column 471 are schematically and separately shown to the right in the figure. There is a first intensity peak 482 part of light portion 472, corresponding to the "correct" intensity peak, and a second intensity peak 484 part of light portion 478, corresponding to an "incorrect" intensity peak. Conventional peak finding may find a respective peak position for respective peak, for example a center position of the peak's light distribution, corresponding to positions v1 and v2 in the figure. Note that the peak position may be in sub-pixel resolution in the shown v-direction.

Further, as also illustrated in the figure, the intensity peaks typically look different, for example have different height and/or width. For example, the intensity peak 482 has an intensity height I1 and the intensity peak 484 has another intensity height I2. The peak position, peak height, and peak width, are examples of peak characteristics. Peak finding at least results in the peak positions, but measures regarding peak height, peak width, and other peak characteristics may be provided as well and associated with respective peak position, for example stored in connection with the peak position.

As realized from the above, a problem is that it from a peak finding perspective is difficult to know which peaks that are "correct" and which that are "incorrect" and should not be used. In other words, it is desirable to be able to find and/or select "correct" intensity peaks, and in other words exclude the "incorrect" ones so they are not used.

A principle that embodiments herein are based on, is that if object points are imaged at least twice, instead of once as conventionally, in a first imaging resulting in first image data and a second imaging resulting in second image data, differences in peak characteristics for intensity peaks in the first and second image data can be exploited to exclude image data regarding "incorrect" intensity peaks.

More particularly, the idea is that intensity peak characteristics, for example peak position, regarding the same object point in the first and second image data, caused by wanted diffuse reflections in accordance with the light triangulation, should not differ, or differ to a much lesser extent between the first and second image data compared to intensity peak characteristics resulting from unwanted reflections, such as caused by specular reflections.

In some embodiments, the different imaging of the object points is accomplished by difference in illumination between the first and second imaging. In some embodiments, the imaging of the object points is accomplished by using different camera view angles, corresponding to different viewpoints, for the first and second imaging. In both cases, the first imaging may be as for the conventional single imaging and it may thus in practice be a matter of adding suitable second imaging and then exploit said differences.

Details of various embodiments as mentioned above are discussed in the following.

A conventional imaging system as exemplified above may be slightly extended and/or operated a bit differently to carry out embodiments herein.

Figure 5A:
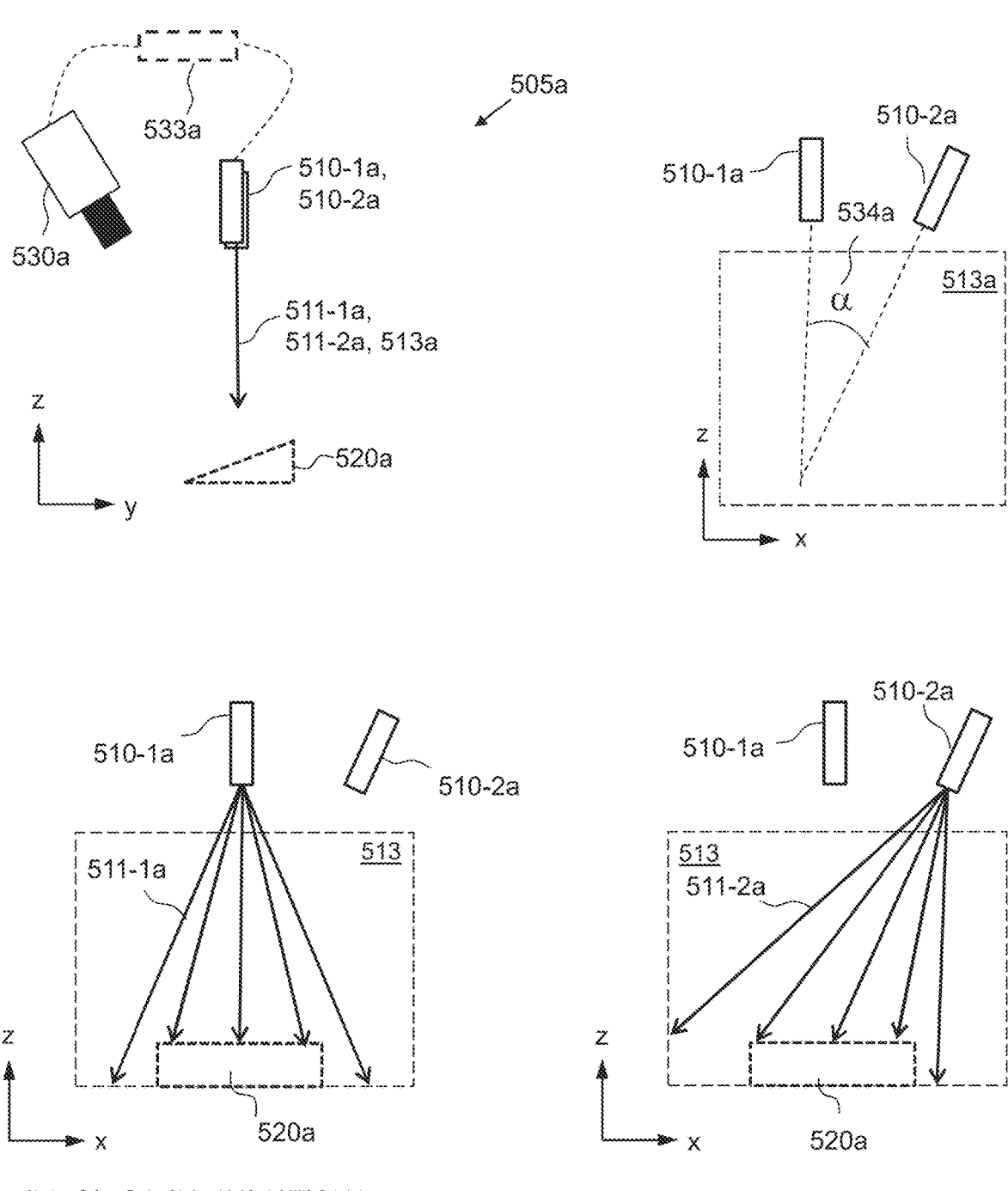

FIGS. 5A-C are schematic examples of imaging systems 305 for carrying out and implementing embodiments herein. Focus in the following will be on what differs compared to conventional systems as discussed above and on differences between the shown systems. The differences are also discussed and explained further below.

FIG. 5A schematically illustrates a simplified imaging system 505a that may be configured to carry out imaging for some embodiments herein and that also may be configured to carry out some embodiments herein. The imaging system 505a is based on light triangulation for 3D imaging of object(s), exemplified by an object 520a in the figure that resembles the edge shaped object in other examples herein to facilitate comparison. The shown system comprises a basic configuration as in a conventional imaging system based on light triangulation as discussed above and comprises: A first light source 510-1a for illuminating the object 520a with light according to a first illumination 511-1a as part of light triangulation. A camera 530a with image sensor (not shown) arranged for sensing reflected light, including from said first illumination, from the object 520a as part of the light triangulation.

Additionally the system comprises a second light source 510-1b for illuminating the object 520a with light according to a second illumination 511-1b also as part of light triangulation.

The imaging system 520a is configured to image object points of the object 520a at least twice in accordance with light triangulation using said first imaging and a second imaging. The first illumination 511-1a is used for the first imaging and the second illumination 511-1b is used for the second imaging. The same camera 530s is here used for both the first and second imaging that thus differs from each other by use of said different illuminations.

The view of the Imaging system in a z-y plane (upper left part of the figure) reveals that the system from this perspective basically looks like and is configured like a conventional imaging system as already discussed above but with an additional light source, the second light source 510-2a, that provides the second illumination 511-2a in same geometrical plane 513a as the first illumination as provided by the first light source 510-1a. A difference between the illuminations is that they have different illumination directions in said plane and thus will illuminate object points from different directions. The light sources as such, for example lasers, may be of the same type and even model, and in practice it may thus be a matter of duplicating a light source as used in a conventional system for example corresponding to the first light source, and arranging it as the second light source for provision of the second illumination, for example in an angular relationship to each other. An example of this shown in the z-x plane (upper right part of the figure), with a an angular difference □ between how the light sources provide respective illumination. The different illumination directions are in the figure thus indicated by the angular difference □ that corresponds to an illumination direction angle difference 534a.

As should be understood, the camera 530a and light sources 510-1a, 510-2a are configured and positioned in relation to each other for light triangulation. The imaging system 505a may for the light triangulation purpose correspond to the system 105 in FIG. 1, but with said additional second illumination and may additionally be configured to perform according to embodiments herein as described further below.

Hence: The object 520a may correspond to the object 220 and is shown located at least partly within field of view of the camera 530a. As in a conventional imaging system for light triangulation the camera is arranged so its field of view will cover where illumination for the light triangulation may be provided on objects that the system is configured to handle for 3D imaging. In general, respective light source such as the light sources 510-1a, 510-2a, is configured to illuminate an object to be imaged with structured light, such as a specific light pattern, exemplified by light planes in FIG. 5A with the first and second illuminations in geometrically same plane 513a and with said different illumination directions in this plane. Another example of structured light that can be used as the illuminations herein are light edges, where respective edge is of an area or portion with illumination, where the edges may be in the geometrically same plane but with different illumination directions in this plane.

The object 520a may thus be illuminated and images may be captured by the imaging system 505a similarly as in and in accordance with conventional light triangulation but so that object points are imaged twice according to the first and second imaging using the first and second illuminations, respectively. The light triangulation as such and respective imaging, for example part of a "scan" of the object 520a, may be carried out correspondingly as in the prior art and involve movement of the light sources 510-1a, 510-2a as a group (with fixed position to each other) and/or the object 320 in relation to each other, so that at different consecutive time instants, different, typically consecutive, portions, or profiles, of the object 520 are illuminated by both the first and second illuminations and first and second images according to the first and second imaging are taken of object points in respective profile. There may be a "scan" of the object like this, with several consecutive profile images taken as in the prior art to cover the whole object, but here with each profile is imaged twice according to the first and second imaging. The lower part of the figure illustrated this for a profile of the object 520a.

The lower left part of the figure shows a situation in the z-x plane with provision of the first illumination 511-1a on the object 520a, and thus illumination on object points of its surface, during which illumination the first imaging is performed, thus with sensed reflected light from this illumination resulting in for example a first image. This is indicated by IMAGING1, ILLUMINATION1 in the figure.

The lower right part of the figure shows corresponding situation in the z-x plane but instead with provision of the second illumination 511-2a on the object 520a and said profile and object points. During the second illumination the second imaging is performed, thus with sensed reflected light from this illumination resulting in for example a second image. This is indicated by IMAGING2, ILLUMINATION2 in the figure.

In light triangulation, typically, but not necessary, the camera, such as the camera 530a, and light source(s), and provided illumination from the light source(s), such as the first and second illuminations and first and second light sources, are fixed in relation to each other. It is then the object, such as the object 520a, that moves in relation to these during scanning and imaging of profiles and corresponding object points so that the whole object is covered with desirable resolution in the scan direction, such as the y-direction in example herein. Respective image, or image frame, thus corresponding to a profile image with imaged object points of the profile, are thus associated with a respective time instant of when the light was captured and the image taken. The resolution to be achieved in the scan directions thus determine a distance the object should move between different profile images being taken, and thus corresponding distance between profile images imaging consecutive profiles in the scan direction. How this may relate to the first and second imaging of embodiment herein is further and separately discussed below.

Images, such as image frames corresponding to profile images, and/or information derived from these images, such as intensity peak positions and possibly also other peak characteristics, may similar as in conventional systems, be provided by and/or processed by the camera 530a, for example by computing capabilities of the camera's image sensor and/or other circuitry integrated with the camera. Additionally or alternatively the images and/or derived information may be transferred for, possibly further, processing outside the camera 330, e.g. to and by a computing device 533a as shown in FIG. 5A, such as a computer, or other device with computing capabilities, that may be part of the imaging system or external from it. Such device may also operate as a control device for the imaging system, for example controlling the camera, light source and/or movement of the object, or there may be a separate control device for this. Said processing may involve processing for carrying out light triangulation related actions and/or actions related to embodiments herein as discussed further below. Embodiments herein may additionally or alternatively be performed remotely and/or by a separate computing unit or device (not shown), separate from imaging system as such. Embodiments herein may even be performed remotely on a server, and/or in a so called computer cloud, is possible, but with the image data as such originating from an imaging system, such as the imaging system 505a, and from light triangulation.

An alternative to separate light sources for the illuminations as in FIG. 5A is a single light source that provides different illuminations, for example by change in illumination direction between first and second imaging. In case of a single light source, such system may be configured to perform some pivotal or rotational position change of the light source and/or changes related to a lens arrangement of the light source, to accomplish the different illumination directions of the first and second illuminations. Separate light sources as in the example for providing the different illumination directions, that is, without the need to move or change position of any light source or parts thereof during operation, of course enable simpler and more robust implementation. Note that In a practical setup with separate light sources as in the example, it may be preferred to arrange the light sources symmetrically, with same angle relative the vertical direction.

FIG. 5B schematically illustrates a simplified view of an imaging system 505b that may be configured to carry out imaging for some embodiments herein and that also may be configured to carry out some embodiments herein Some features and configuration of the system may be same as in the imaging system 505a and in accordance with the discussions above in connection with FIG. 5A. Focus in the following will therefore only be of differences. Other corresponding features as discussed above in relation to FIG. 5A may be as already explained. For example, in FIG. 5B there is a camera 530b that may correspond to the camera 530a, an object 520b that may correspond to the object 520a and a computing device 533b that may correspond to the computing device 533a. There is shown a single light source unit but that may comprise or correspond to two different light sources, a first light source 510-1b and a second light source 510-2b, for provision of two different illuminations, a first illumination 511-1b and a second illumination 511-2b for use in first and second imaging, respectively. Except for this, the imaging system 505b may be as described above in relation to the imaging system 505a. Said illuminations are here provided with same illumination direction that may be as in a conventional imaging system, such as in the imaging system 205 and/or as the first illumination 511-1a. The difference in illuminations is thus not in illumination directions as illustrated in the lower part of FIG. 5B with same illumination directions. The difference in the illuminations is instead that different polarizations and/or light wavelengths are used.

The lower left part of the figure shows a situation in the z-x plane with provision of the first illumination 511-1b on the object 520b, and thus illumination on object points of its surface corresponding to an object profile, during which illumination the first imaging is performed, thus with sensed reflected light from this illumination resulting in for example a first image. This is indicated by IMAGING1, ILLUMI-NATION1 in the figure. The lower right part of the figure shows corresponding situation in the z-x plane but instead with provision of the second illumination 511-2b on the object 520b and said profile and object points. During the second illumination, the second imaging is performed, thus with sensed reflected light from this illumination resulting in for example a second image. This is indicated by IMAG-ING2, ILLUMINATION2 in the figure.

Note that, of course, although not shown in any figure herein, imaging for embodiments herein may be performed by an imaging system with illuminations that differ by illumination direction at the same time as there is difference also in wavelengths and/or polarization.

Hence, additionally, or alternatively, to illumination direction, illuminations used for imaging that embodiments herein may be based on may differ from each other by having different polarizations and/or light wavelengths. Different polarizations and/or wavelengths cause different specular reflections and resulting differences in intensity peak characteristics be exploited as an alternative to or in addition to different illumination directions.

For example: The first illumination 511-1b may be formed by light having first polarization, such as a first linear polarization, and the different second illumination 511-2b may be formed by light having another, second polarization, such as another linear polarization. Additionally or alternatively, the first illumination 511-1b may be light having first wavelength or wavelength range, and the different second illumination 511-2b may be formed by light having another, second, wavelength or wavelength range, preferably not overlapping.

Since object surface material, color, etc. may affect different polarizations and wavelengths differently, it may be a more versatile solution using different illumination directions instead or in addition to this. Also, a system using different illumination directions may be easier to adjust and setup when not having to take into consideration differences in or adjustments of the light sources as such. Instead two identical light sources, for example lasers, can be used and just arranging them with different illumination directions as explained above in relation to the rest of the imaging system.

Further, note that an alternative to the imaging systems 505a-b are such where the first and second illumination are provided in parallel geometrical planes instead of same geometrical plane 513a, b. In case of parallel light planes, the second plane is thus offset geometrically in relation to the first plane, for example offset in the scan direction, such as the y-direction in examples herein. The offset may be selected to compensate for the distance that object points may have moved since the first imaging so that the second light plane intersects on the same location on the object, and thus more accurately illuminates same object points as the first light plane. Also note that although imaging herein is about imaging object points twice, reflected light need not come from exactly the same object points in the first and second imaging. It may suffice that the object pints are so close to each other that they can be considered the same. This, parallel planes and compensation by parallel plane offset are further discussed below.

FIG. 5C schematically illustrates a simplified view of an imaging system 505c that may be configured to carry out imaging for some embodiments herein and that also may be configured to carry out embodiments herein. Some features and configuration of the system may be same as in the imaging system 505a in accordance with the discussions above in connection with FIG. 5A. Focus in the following will therefore only be of differences. Other corresponding features as discussed above in relation to FIG. 5A may be as already explained.

In FIG. 5C there is a single light source 510c for provision of a single illumination 511c just as in conventional light triangulation and that is used for both first and second imaging that may correspond to first and second imaging as above. The light source 510c and illumination 511c may for example correspond to the first light source 510-1a and first illumination 511-1. There is also an object 520c that may correspond to the object 520a. A computing device 533c may correspond to the computing device 533a. The main difference is that instead of one camera, there are two cameras, a first camera 530-1c and a second camera 530-2c, with different view angles for imaging the object. The different camera view angles are in the figure indicated by a camera view angle difference 535c. The first camera 530-1c may be used for the first imaging and the second camera 530-2c for the second imaging The lower part of the figure shows a situation in the z-x plane with provision of the illumination 511c on the object 520c, and thus illumination on object points of its surface corresponding to an object profile, during which illumination both the first and second imaging are performed, preferably simultaneously. The same illumination is thus used for the first and second imaging, as also indicated in the figure. The first imaging is performed by the first camera 530-1c with a first view angle, indicated in the figure by IMAGING1 WITH CAMERA VIEW ANGLE1, and resulting in for example a first image. The second imaging is performed by the second camera 530-2c and another, second, view angle, indicated in the figure by IMAGING2 WITH CAMERA VIEW ANGLE2, resulting in for example a second image.

Note that other direction or directions of illumination and camera view angle(s) than shown in the examples of FIGS. 5A-C of course are possible. The principle behind embodiments herein is not dependent on any specific illumination direction or directions, or camera view angle(s). although, of course, as realized by the skilled person, just as in any light triangulation based system, illuminations direction(s) and camera view angle(s) shall be used so that object point to be 3D imaged can be illuminated and reflections from these reach the camera or cameras and be imaged.

Further, as should be realized from the idea underlying embodiments herein, said different illuminations and/or camera view angles discussed in relation to FIGS. 5A-C, for the first and second imaging should differ from each other in such way that specular and diffuse reflections are affected differently. In practice the difference may be such that specular reflections are affected more and diffuse reflections are affected less by the difference. Already a small difference will have some effect in this respect. More exactly which difference is best to use in a specific practical case may be found out from routine tests and experiments, for example based on imaging using any of the imaging systems 505*a-c*, while applying embodiments herein, such as described in the following, and for example comparing effects that various changes in the differences have on 3D imaging. The skilled person will be able to setup a system with for example suitable light direction(s) and/or camera view angle(s) based on routine testing and experimentation using the system at hand and/or with knowledge of the camera, the objects to be imaged etc. However, in case of different illumination directions, a suitable difference may be expected in the range 5 to 45 degrees, which in most situations should provide a sufficient difference but not so much that it would be too difficult or impossible to illuminate object points and image reflected light during the first and second imaging. A lower part of the range may be preferred, such as up to 10, 15, 20 or 25 degrees, since larger difference makes it more difficult to illuminate same object points. In case of different camera view angles, a suitable difference may be expected in the range 5 to 15 degrees, which in most situations should provide a sufficient difference without causing too much difference in height/depth resolution, that is, in the z-direction in the examples herein. In practice it may be best to attempt a very small difference first and see if it results in sufficient and/or satisfactory improvements compared to a conventional setup and use of the imaging system. If not, slightly increase the difference until the this is the case.

Figure 6B:
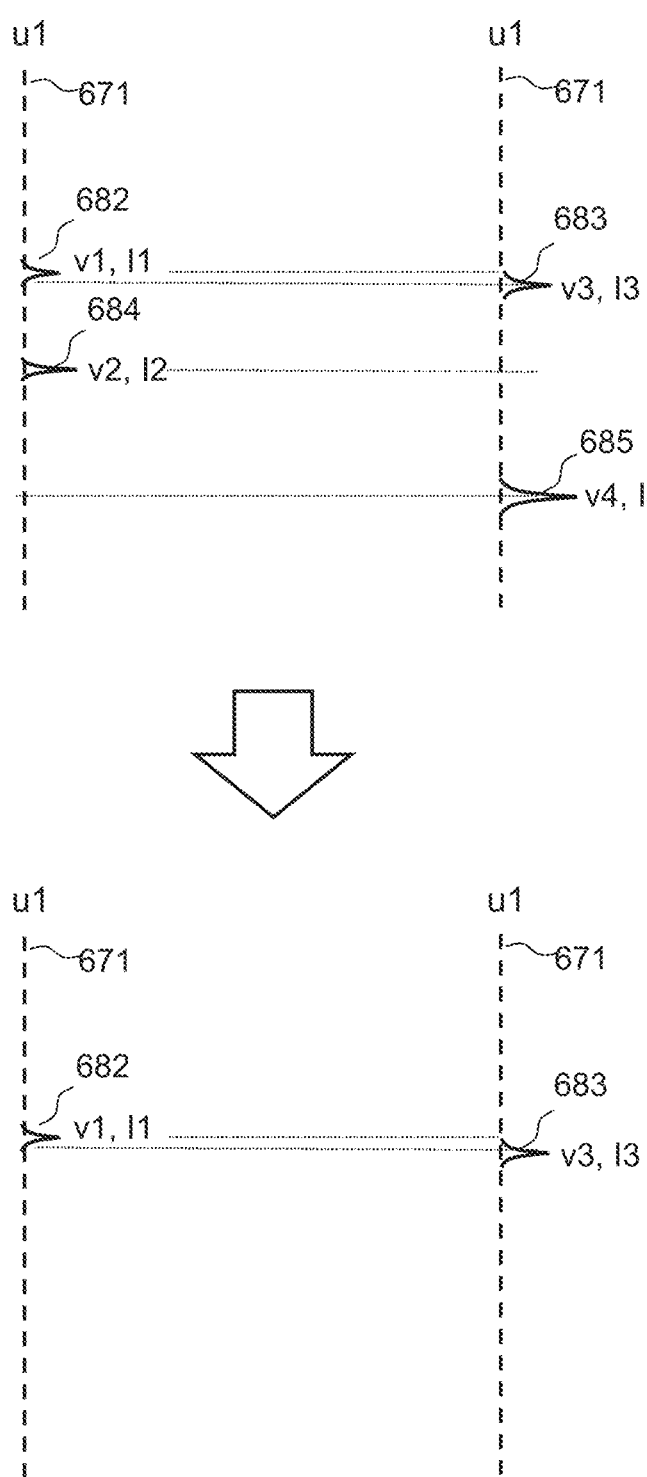

FIGS. 6A-B schematically illustrates example results from first and second imaging as discussed above, for example when the imaging system 505*a* has been used for the imaging.

FIG. 6A shows, in its upper part, first image 670-1, named IMAGE1, resulting from the first imaging, and in its lower part it shows a second image 670-2, named IMAGE2, resulting from the second imaging.

It can be identified that IMAGE1 in this example looks identical to IMAGE1 of FIG. 4, already discussed above. This is just to simplify and facilitate understanding. As already mentioned above, the first illumination 511-1*a* and the first imaging may be as in the prior art. Hence, in the shown example, the features in the upper part of FIG. 6A relating to IMAGE1 may be as the corresponding features in IMAGE1 of FIG. 4 with exemplifying result from a prior art imaging system. In practice, of course, since not the exactly same imaging systems are used and imaging is taking place at different points in time, the object is unlikely to be positioned exactly in the same way and in the same environment when imaged again, etc. Hence, IMAGE1 would in practice not look exactly the same in FIG. 6A as in FIG. 4, although that is here assumed to be the case for exemplifying purpose. Anyhow, in this example, the first image 670-1 looks like and corresponds to the image 470, and is in the example assumed to have been sensed by an image sensor of the camera 530*a* of the imaging system 505*a*. In the first image 670-1, sensed light that corresponds to a first light portion 672-1 is light that has been projected on and directly reflected from object points of an object surface towards the camera 530*a* and been sensed by the camera's image sensor in accordance with the first imaging. The first light portion 672-1 thus captures information about a certain profile of the imaged object and object points thereof. Note that, just as in the example of FIG. 4, the light portion 472 and corresponding object profile is just an arbitrary example, no actual object having such profile is shown herein. The light portion

472 could for example alternatively look like the profile 241 in FIG. 2 and the object look like the object 520*a*.

As explained above in relation to FIG. 4 and as in conventional light triangulation, there is expected at most one "correct" intensity peak per column. However, the first image 670-1 has captured further light as well, exemplified by light portions 674, 676, 678, for example light resulting from second or higher order specular reflections. There may thus in practice, as in the shown example, along a column, such as column 671, named u1 in the figure, occur several separated portions with light. As can be seen in the shown example, the column 671 intersects both the "wanted" light portion 672-1 and the light portion 678. In practice there may be several intensity peaks along respective column. In the figure, the intensity peaks along column 671 are schematically and separately shown also to the right of IMAGE1 in the figure. There is a first intensity peak 682 part of the first light portion 672-1, corresponding to the "correct" intensity peak, and a second intensity peak 684 part of light portion 678, corresponding to an "incorrect" intensity peak. Conventional peak finding may find respective peak position for respective peak, for example corresponding to positions v1 and v2 in the figure. As already mentioned above, peak finding at least results in the peak positions, but measures regarding peak height, peak width, and other peak characteristics may be provided as well and associated with respective peak position. For example, as indicated in the figure, intensity peak heights, such as in the form of intensity values I1, I2 may be provided for the intensity peaks 682, 684, respectively.

As mentioned above in relation to FIG. 4, a problem is that it is difficult to know which peaks are "correct" and which that are "incorrect" and if possible should not be used. The second imaging may be used in accordance with embodiments herein to solve, or at least reduce, this problem.

The second image 670-2, IMAGE2, is resulting from the second imaging, in the example a result from the example as in FIG. 5A with illumination in the same geometrical plane during the first and second imaging, but with other illumination directions in this plane compared to the first imaging. Object points corresponding to the profile being imaged are thus imaged twice. As expected there is a second light portion 672-2 with light from the second illumination 511-2*a* that has been projected on and directly reflected by object points towards the camera 530*a* and sensed by the camera's image sensor in accordance with the second imaging. Positions of sensed direct, and especially diffuse, directly reflected light from the object points are not, or at least typically less, affected by the change in illumination directions, and the second light portion 672-2 looks essentially the same with corresponding positions as the first light portion 672-1. However, other light portions, such as light portions 673. 675 and 677 in the second image, resulting from for example second and higher order specular reflections, look and are positioned differently in the second image compared to the first image 670-1.

Same as for the first image 670-1, since also the second image 670-2 is the result from light triangulation, it is for the second image also expected at most one "correct" intensity peak per column. Along column 671, named u1 in the figure, there are several separated portions with light and the column 671 intersects both the "wanted" second light portion 672-2 and the light portion 675. Similar as for the first image 670-1, the intensity peaks along column 671, u1, in the second image 670-2 are schematically and separately shown to the right of IMAGE2 in the figure. There is a third intensity peak 683 part of the "wanted" second light portion 672-1, corresponding to a "correct" intensity peak, and a fourth intensity peak 685 part of light portion 677, corresponding to an "incorrect" intensity peak. Same type of peak finding, and possible additional extraction of other peak characteristics, as for the first image 670-1 may be applied to the second image 670-2, which may result in peak positions v3, v4 along u1, and possibly for example peak heights with intensity values I1, I2, indicated in the figure for the intensity peaks 683, 685, respectively.

As can be noted, for reasons indicated above, the "correct" intensity peaks 682, 683, appear as they should at same, or substantially same, positions in the first and second images 670-1, 670-2, that is, v1 and v3 are the same or substantially the same position, while the other "incorrect" peaks differ much more in position between the images. Also, there is greater variation in other peak characteristics, such as in height and width, for the "incorrect" peaks along u1. Embodiments herein exploit such differences in peak characteristics between the first and second imaging, for example as in the following examples.

FIG. 6B is to support explanation regarding how information as shown in FIG. 6A may be used. Peaks are shown along the column 671, named u1. Peaks relating to an object point with light captured in this column from both the first image and the second image, that is, resulting from both the first and second imaging, are shown side by side to facilitate comparison.

As can be seen, the "correct" peaks at v1, v3 have very close positions in v, while the "incorrect" peaks at v2, v4 are more distant from each other and the other peaks.

Hence, by comparing intensity peak positions between corresponding columns of said first and second images, that is, images resulting from the first and second imaging of object points, it can be found out which intensity peaks are "correct", or at least more likely "correct", and/or which are "incorrect", or more likely "incorrect". Intensity peak data of "incorrect" peaks should be excluded for use in for example 3D imaging. Hence, as shown in the lower part of FIG. 6B, intensity peak data relating to the "incorrect" intensity peaks 684, 685 a v2 and v4 have been excluded based on comparison of peak positions between the first and second images.

Performing the above kind of comparison of peak positions for all columns for all images from first and second imaging, including for all scanned profiles of an object, and use it to find and excluding "incorrect" intensity peaks thus enable a better quality 3D imaging with less artifacts, such as "spikes".

In the comparison of intensity peak positions there may be used a criterion or criteria to determine the exclusion of intensity peak data, such that there is exclusion of intensity peak data for an intensity peak in a peak position for any of the first or second images, if the other image lacks an intensity peak in the corresponding peak position. For example, there may be defined a suitable position difference threshold that any difference in peak positions must be within in order not to exclude intensity peak data for the involved peaks. What a suitable difference is can be found out by the skilled person with knowledge of the imaging system used for the first and second imaging and how it is configured, and/or from routine testing and/or experiments to find a difference that results in satisfying 3D imaging of the actual object while at the same time having the effect of reducing artifacts, such as "spikes", in the 3D imaging.

In practice, to facilitate implementation of position comparison, permutations of all peak pairs between the first and second images regarding the same object profile, and thus object points, may be formed and the position differences for these pairs be computed and compared with for example the position difference threshold mentioned above. Intensity peak data for peak pairs with position difference within the threshold are kept while intensity peak data for all other peaks are excluded. In the shown example there is for column u1, 4 permutations, that is, possible combinations, for which position differences thus should be computed, namely: |v1–v3|, |v1–v4|, |v2–v3|, |v2–v4|. As realized from the figure, |v1–v3| has the smallest position difference and use of a threshold as mentioned can make sure that only intensity peak image data relating to the intensity peaks at v1 and v3 are kept and thus the intensity peak data for the intensity peaks at v2 and v4 are excluded for use in 3D imaging.

Figure 7:
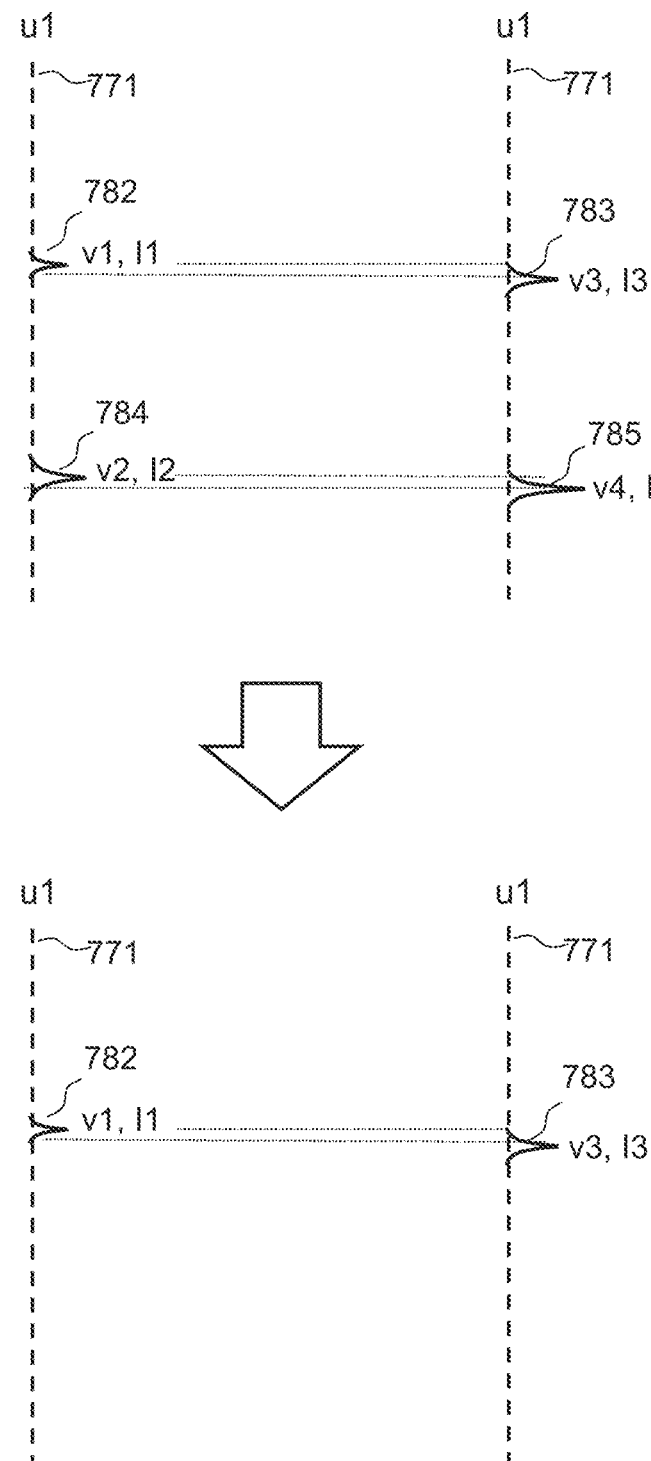
FIG. 7 is a schematic figure in a similar format as FIG. 6B for support explanation regarding how information from the first and second imaging as in embodiments herein further may be used.

FIG. 7 is a schematic figure in a similar format as FIG. 6B and to support explanation regarding how information from the first and second imaging further may be used. The situation here is not based exactly on what was shown in FIG. 6A, but on a bit modified situation with "incorrect" peaks that happen to occur at approximately same positions in both images and thus cannot be handled as above based on position. The difference in FIG. 7 compared to FIGS. 6A-B is basically that the peak position at v4 has changed position so it is closer to and almost the same as the peak position at v3.

The upper part show peaks along a column 771, corresponding to u1, from first imaging (to the left) and second imaging (to the right). There are "correct" intensity peaks 782, 783, at v1, v3 with intensities I1 and I3. There are further "incorrect" intensity peaks 784, 785, at v2, v4, with intensities I2 and I4.

As can be seen in the figure, the "correct" peaks of the peak pair at v1, v3 and the "incorrect" peaks of the peak pair at v2, v4, have all very close positions in v. In practice, most "incorrect" intensity peaks will typically be at sufficient different positions so they can be excluded based on position difference as discussed above, but it can also happen that incorrect intensity peaks happen to occur at same or very close positions as in this example. To able to find and exclude intensity peak data for the "incorrect" peaks in such situation, other peak characteristics than position may be compared, such as relating to peak height and/or width. It is more likely that these peak characteristics differ to a greater extend between the first and second imaging for "incorrect" intensity peaks than for "correct" intensity peaks.

Hence, as shown in the lower part of FIG. 6B, intensity peak data relating to the "incorrect" intensity peaks 684, 685 at v2 and v4 have been excluded based on comparison of peak height and/or peak width. For example, the difference |I3–I1| may be small enough, such as below a peak height threshold, for the peaks at these positions to be kept while the difference |I4–I2| is not small enough according to the threshold, whereby there is exclusion of intensity peak data for the "incorrect" peaks at v2, v4. In other words, intensity peak characteristics that differ between first and second image data from the first and second imaging, respectively, may involve intensity peak characteristics for intensity peaks having corresponding peak positions in the first and second image data. The intensity peak characteristics that are compared may comprise one or more measures of intensity peak height and/or intensity peak width. Similarly as for position, there may be used a criterion or criteria to determine the exclusion of intensity peak data, such that there is exclusion of intensity peak image data for intensity peaks having corresponding peak positions in the first and second image based on difference in intensity peak heights and/or intensity peak widths.

It may be reasonable to look at further peak characteristics, in addition to the position, such as the peak height and/or width, if there for an object point, for example according to and in a column, is more than one peak position with correspondingly positioned intensity peaks in the first and second image data. If peaks at "same" position differ too much in height and/or width, this may indicate that the peaks are due to different type of reflections and more likely are "incorrect", at least if there are other peaks at other but corresponding positions with height and/or width that differ less.

In some cases it may be desirable to apply exclusion based on peak characteristics for peaks in corresponding position only if there for an object point are multiple peak positions with peak pairs at corresponding peak positions, that is in both images, for example in several positions along same column. Since it is known that only one of these peak positions, at most, should map to an actual object point in accordance with the light triangulation, intensity peak data should be excluded for the intensity peaks that most likely are incorrect, that is, most likely are not mapping to a real object point imaged twice. It is in such situation more likely that correspondingly positioned intensity peaks with greater difference in for example intensity peak heights and/or intensity peak widths are "incorrect", and thus should be excluded.

In case there for same object point, such as along a column, is only one pair of correspondingly positioned intensity peaks (perhaps left from previous exclusion based on position), it may be considered to keep these and not compare other peak characteristics, based on assumption that if there is only one such peak pair they should be "correct" and their position thus mapping to the object point. However, in case of too great difference, it may still be preferred to exclude the peak image data, for example if the difference is such that it cannot, or is unlikely to, occur in practice for an intensity peak caused by direct reflections from an object point given the circumstances in a specific case, such as in view of the setup, settings and configuration of the imaging system, type of object being imaged etc.

A way to implement comparison in case of several different peak characteristics being involved, may be by using a so called cost or score function and that operates on the peak characteristics in questions, where the function may be defined and/or configured to "weight" the different characteristics, or measures thereof, for peak together, resulting in a single cost or score for each peak, for example a single value. Then it may be matter to exclude intensity peak data for peaks with cost or score according to the function that is above a certain threshold cost or below a certain threshold score.

Such threshold, as well as other thresholds and threshold values mentioned herein, may be predefined or predetermined, and/or be configurable, for example by a user operating the imaging system being used and/or device implementing embodiments herein, making it easy to test and experiment to find a suitable threshold to use that works well given the circumstances in a specific case and thereby also easily can be changed if/when relevant circumstances change, for example due to relevant changes in setup, settings and configuration of the imaging system used, type of object being imaged etc.

Any threshold mentioned herein may be configurable in a flexible way. There can e.g. be implemented a slider bar or similar that changes the threshold and the result can be visualized directly in a virtual 3D object drawn based on the remaining intensity peak data after exclusion. This makes it possible for a user to find a suitable threshold level that excludes intensity peak data that else would result in artifacts, such as "spikes", when the 3D object is drawn. At the same time the user can check that the threshold is not resulting in any problematic loss of object details desirable to keep, indicating that also intensity peak data of "correct" peaks may have been excluded as well.

As realized from the above, after exclusion based on difference in peak characteristics from the first and second imaging, it will typically remain a pair of intensity peaks at corresponding positions in both first and second images. It is then a matter of determining which intensity peak data from this pair of peaks to use for the 3D imaging. Several possibilities are possible. Any of the peaks of the pair may be used, for example always using intensity peak data from the first imaging and in that case the second imaging can be seen as a kind of added validator step to form data used as above for being able to exclude intensity peak data for incorrect peaks. Another possibility is to use the intensity peak data of the intensity peak with the lowest height, for example lowest intensity value indicating the height. Reason for this is that may happen that one of the peaks is a direct specular reflection that has resulted in a saturated peak and pixels during the imaging whereby its position and intensity value can be expected to be less accurate for such peak. Peak data from both peaks can alternatively be used, for example forming an average using intensity peak data from both peaks. Intensity peak data to use can also be based on that it should be a peak with peak characteristics, such as intensity height, within a certain range, so that using intensity peak data of peaks with too weak or too strong intensities are avoided when possible, since that may indicate that the intensity peak data from such peak is less accurate.

As understood from the above, the quality of the 3D imaging can be even further improved through determination of which intensity peak data to use of peak pair that remains after exclusion of other intensity peak data.

FIG. 8 is a flowchart for schematically illustrating embodiments of a method according to embodiments herein. The actions below, which may form the method, are for forming image data for use in 3D imaging of an object, for example any one of the objects 520*a-c*, wherein said image data is, or result, from an imaging system, such as any one of the imaging systems 505*a-c*, based on light triangulation for 3D imaging of the object. Said imaging system comprises at least one camera, for example the camera 530*a*, 530*b* or cameras 530-1*c*, 530-1*c*, and at least one light source, for example the light sources 510-1*a*, 510-2*a*, 510-1*b*, 510-2*b* or 510*c*, for provision one or more illuminations, such as the illuminations 511-1*a*, 511-2*a*, 511-1*b*, 511-2*b* or 511*c*, in one or more light planes that geometrically correspond to the same plane or parallel planes. The imaging system and said at least one camera are further configured to image object points of the object at least twice, according to a first imaging and second imaging, during illumination of the object points by said one or more illuminations and in accordance with the light triangulation. Said first imaging and second imaging differ from each other in how specular reflections caused by said one or more illuminations are being imaged.

As used herein, image data "resulting from" or "from" the imaging system includes image data generated by and/or that originates from the imaging system, that is, image data that is a result from imaging by the imaging system. Original image data sensed by the imaging system may have been processed to result in the image data mentioned above in some embodiments, for example the image data may be based on intensity peak positions extracted from the original image data as sensed.

In some embodiments, said one or more illuminations comprise a first illumination for illuminating the object points during the first imaging and a different, second, illumination for illuminating the image points during the second imaging, whereby specular reflections caused by said different illuminations will differ and be imaged differently by the first and second imaging. Examples of this was discussed above in relation to the imaging systems 505$a,b$ and FIGS. 5A-B.

These embodiments allows for simple adaptation of a conventional imaging system to be able to carry out said first and second imaging. It also makes it possible to apply the method, more or less directly on profile images from and/or even in the camera. First and second image data for the profile images can be directly obtained when ready in the camera and be compared, possibly after simple alignment to achieve said common mapping if this is needed, for example in case of parallel light planes with an offset in between. This is in contrast to if instead light planes in intersecting geometrical planes instead would be used, which typically require to first obtain image data from several profile images, such as for the whole object, then form a first and second "point clouds" from the image data, one from the first imaging and the other from the second imaging. Thereafter apply a transform to at least one of the "point clouds" to accomplish said common mapping, before the image data for corresponding object profiles can be obtained from the two resulting "point clouds".

Hence, with the illuminations in same or parallel geometrical planes, less intermediate storing of data is needed and less complex processing is required for implementation, thus facilitating efficient implementation for example directly in the camera. The image data can be obtained as pairs of scanned profile images according to the first and second imaging, directly when available, and the image data for use in the 3D imaging, as in the action below, can thereafter be formed directly per profile as well. Further, with illuminations in geographically the same plane and using one camera, it can be sufficient with one calibration for one light plane, as conventionally, while it with light planes in geometrically intersecting planes typically is required separate calibration per light plane.

In these embodiments, said first and second imaging will typically involve separate images taken by one and the same camera of object points that thereby are imaged at least twice, that is, image points that are or are regarded the same as explained below.

Further, note that by suitable system setup regarding the illuminations, for example said first and second illumination for the first and second imaging, respectively, the illuminations, such as in two light planes, may be parallel with a compensating offset in between, as also indicated elsewhere herein, so that the same object points are illuminated and imaged during the first and second imaging. That is, the second illumination, such a light plane, may be provided where the points illuminated by the first illumination will be when the second imaging is performed, for example by providing the first and second illumination as two parallel but slightly offset light planes where the offset is adapted to compensate for the distance the object and object points have moved since they were imaged by the first imaging.

In embodiments, said first and second illuminations differ from each other by having different illumination directions in said light planes, such as in the imaging system 505$a$ and FIG. 5A. This efficient and resource efficient implementation, where from hardware resource perspective may be a matter of duplicating a light source as already in use in an already existing conventional 3D imaging system based on light triangulation and arranging it in the system to accomplish the different illumination directions.

In some embodiments, said at least one camera is operative with different camera view angles for imaging of the object. In these embodiments, the first and second imaging differ from each other by use of said different camera view angles, whereby specular reflections caused by said different illuminations will be imaged differently by the first and second imaging. Examples of this was discussed above in relation to the imaging system 505$c$ and FIG. 5C.

In general, the difference during the first imaging and second imaging that causes difference in how specular reflections caused by said one or more illuminations imaged, may pertain to one or more of the following: illumination directions, light polarizations, light wavelengths, and camera view angles, as also further discussed elsewhere herein.

The method and/or actions below and indicated in FIG. 8 may be performed by device(s), i.e. one or more devices, such as any one of the cameras 530$a$, 530$b$, 530-1$c$, 530-2$c$, and/or the computing device 533, or by the imaging system and/or suitable device(s) thereof, or suitable device(s) external, even remote, from it, as also discussed elsewhere herein. Device(s) for performing the method and actions thereof are further described below.

Note that the actions below may be taken in any suitable order and/or be carried out fully or partly overlapping in time when this is possible and suitable.

Action 801

It is obtained first image data and second image data. The first image data comprise at least positions of intensity peaks resulting from said first imaging of object points by the imaging system. The second image data comprise at least positions of intensity peaks resulting from said second imaging of the object points by the imaging system. Said first and second image data correspond to first and second profile images, respectively, with common mapping to real world coordinates for intensity peaks caused by direct reflections from the object in accordance with the light triangulation. In other words, there is common mapping to real world coordinate for intensity peaks caused by direct reflections from said object points imaged twice.

In some embodiments the present action is performed by the camera, and the image data may thus be obtained internally by the camera. In other embodiments, the present action may be performed by device(s) outside the camera and the present action may comprise to directly or indirectly receiving the image data from the camera, possibly via some intermediate device.

In some embodiments, the obtained image data correspond to image as sensed by the image sensor, for example when embodiments are performed in connection with peak finding. In other embodiments. The obtained image data is formed by information from and after peak finding, for example information on peak positions and possible also other peak characteristics of the intensity peaks.

In some embodiments, Action 801 comprises sub actions, such as one or more of Actions 801$a$-$c$ separately described below.

Action 801*a*

In some embodiments, for which the device(s) performing the method comprises the camera, Action 801 also comprises to perform the first and different second imaging of object points. In other embodiments, a corresponding action is separate from the method and not part of Action 801, for example in case the method is performed on the image data later, for example separated from the camera, imaging or even the imaging system.

Action 801*b*

In some embodiments, Action 801 comprises to find intensity peak positions and optionally to extract further peak characteristic(s) per peak position. This may thus be the case for embodiments performed in connection with peak finding, which typically means that these are embodiments for which the method is performed by device(s) comprising the camera or at least the imaging system. In other embodiments, peak finding is performed separately, prior to carrying out the method and Action 801. The peak finding as such may be conventional although that exclusion of intensity peaks, and/or intensity peak data, fully or partly should be performed in accordance with embodiments herein.

Action 801*c*

In some embodiments, Action 801 comprises to transform at least one of the first or second image data to accomplish said common mapping to real world coordinates. This may be the case for the embodiments with said parallel light planes, but for which the transform can be simple and performed on image data per image frame. This may alternatively or additionally be the case for the embodiments using said different camera view angles since the mapping to real world camera will be different between the cameras. Also in this case the transform can be performed on image data per image frame since the first and second imaging are of the same object points using the same illumination.

Note that an action like the present action is typically needed in case of first and second illuminations in light planes that are in separate and geometrically intersecting planes. as mentioned as an alternative above. In that case, however, as already indicated above, the transform need to be carried out on image data involving several images according to respective first and second imaging, for example of the whole object, to make sure that same object points are covered. After this, it is then typically needed to select out, from resulting "point clouds", first and second image data of corresponding profile images to be obtained so that the same object points are involved in both profile images.

Action 802

Said image data is formed for use in the 3D imaging of the object based on said obtained first and second image data. Said image data is formed with exclusion of intensity peak data that for a respective object point of said object points imaged twice have intensity peak characteristics that differ, or differ more than a certain extent, between the first and second image data. Predefined one or more first criteria may be used to determine if the peak characteristics differ or differ more than said certain extent.

There may be at least one common direction, such as along columns, in said first and second profile images where it, per parallel pixel line in this direction of respective profile image, is expected at most one intensity peak caused by reflections from the object in accordance with the light triangulation. Said intensity peak characteristics difference may be based on comparison between correspondingly positioned such pixel lines, such as columns. There will always be such direction in a profile image from light triangulation due to its nature and how 3D imaging based on light triangulation works. Typically, with conventional setup of the imaging system, and as in examples herein, said pixel lines will correspond to image sensor columns and thus corresponding pixel columns of the first and second profile images may be compared, where the direction of columns corresponding to the height, or depth, direction, that is, the z-dimension in the examples herein. In other words, typically a column vise comparison may be performed to find the differences, and/or similarities, in intensity peak characteristics. For example, intensity peaks in column #1 of the first profile image may be compared with intensity peaks in column #1 in the second profile image etc. The common mapping and comparing between correspondingly positioned pixel lines in common direction, for example between columns, makes it relevant and possible to compare positions of intensity peaks along the correspondingly positioned pixel lines, such as along same columns, of the first and second profile images.

In some embodiments, the intensity peak characteristics comprise intensity peak position, and said intensity peak characteristics difference may be based on comparison between intensity peak positions of said corresponding pixel lines. As in the examples above, with peak position as peak characteristic, it may simply be matter of identifying if there are peaks at corresponding position in both profile images regarding the same profile of the object, corresponding to object points imaged twice. If this is not the case, the corresponding intensity peak image data of the peak can be excluded for use in the 3D imaging. This since it is, as explained above, are expected intensity peaks at about same positions in both profile images if the intensity peaks are "correct" and formed by direct and typically diffuse reflections in accordance with the light triangulation.

In some embodiments, Action 802 comprises sub actions, such as one or more of Actions 801*a-c* described below.

Action 802*a*

In some embodiments, the peak characteristics comprise peak position and there is exclusion of intensity peak data for an intensity peak in a peak position according to the first or second image data if the other first or second image data lack an intensity peak in corresponding peak position.

Corresponding peak position here relates to same peak position or sufficiently near each other to be able to be an intensity peak resulting from the same object point imaged twice, which in practice may correspond to peak positions sufficiently near each other, for example according to a predefined first threshold, such as a position difference threshold discussed above.

With comparison between intensity peak positions of said corresponding pixel lines, it is a matter of comparing positions of peaks along the corresponding pixel lines, for example corresponding columns.

For respective intensity peak in say a column u in one of the profile images, for example in a position v of column u of the first profile image, it may be checked if there is an intensity peak in column u of the second profile image at or near position v. Another way that may be preferred from implementation point of view, is to find position of all peaks in the corresponding pixel lines and compute position difference between peak position in the corresponding pixel lines, that is, for all permutations of peak position pairs between the corresponding pixel lines, as exemplified above.

Action 802*b*

In some embodiments, said intensity peak characteristics that differ between the first and second image data involve intensity peak characteristics of intensity peaks having corresponding peak positions in the first and second image data. The intensity peak characteristics is thus not, at least not only, peak position, but may involve for example involve intensity peak height and/or intensity peak width.

In some of these embodiments, said intensity peak characteristics comprise one or more of intensity peak height and/or intensity peak width, for example measures thereof, and there is exclusion of intensity peak image data for intensity peaks having corresponding peak positions in the first and second image based on difference in intensity peak heights and/or intensity peak widths for these intensity peaks.

In some of these embodiments, said exclusion of intensity peak image data is made to the first and the second image data for intensity peaks in corresponding peak positions with intensity peaks that differ too much from each other according to a respective comparison value indicative of two or more different peak characteristics for respective peak. Said respective comparison value resulting from a predefined function operating on the peak image data of respective peak. The predefined function is preferably a so called cost or score function, that depending on said two or more different peak characteristics for a peak position with peaks in the first and second image data, the function returns a cost or score value for comparison with the comparison value, for example so that intensity peak data for peaks with score or cost below or above the comparison value are excluded. Action 802c In some embodiments, said forming of image data further comprises determination of image data for use in the 3D imaging of the object, wherein the determination comprises, for intensity peaks in corresponding peak positions: to select the intensity peak data from the first or second image data with the lowest intensity peak height, or to select intensity peak data from predetermined one of the first or second image data, or to combine intensity peak data from the first or second image data.

As already indicated above, a principle that said method and embodiments herein are based on, is that if object points are imaged at least twice under circumstances as above, intensity peak characteristics regarding the same object point in the first and second image data, caused by wanted diffuse reflections in accordance with the light triangulation, will not differ, or differ to a much lesser extent compared to intensity peak characteristics resulting from unwanted reflections, such as caused by second or higher order specular reflections. This is due to that the difference in illumination will affect specular reflections more than diffuse reflections and/or that difference camera view angles (corresponding to different viewpoints) will experience greater differences in case of specular reflection(s) than in case of diffuse reflections.

The exclusion will thus have an effect of excluding intensity peak data corresponding to artifacts, particularly artifacts in the form of intensity peak data caused by unwanted, but often hard to avoid, specular reflections from the imaging. This is intensity peak data pertaining to what is referred to as "incorrect" intensity peaks in examples herein. The formed image data with said exclusion enable higher quality 3D imaging of the object with less artifacts that else would be present.

In other words, said first and second profile images image same object profile of the object corresponding to said object points. The object profile corresponds to locations in the first and second profile image with "correct" intensity peaks, that is, intensity peaks resulting from direct, typically diffuse, reflections of illumination from said object points. However, in practice, there will also be intensity peaks corresponding to artifacts, for example resulting from said secondary specular reflections that have been imaged as well, but that are undesirable and should not be used, that is, "incorrect", intensity peaks. Image data corresponding to such intensity peaks should be excluded, for example removed from respective profile image, so they will not be used in the 3D imaging. An alternative to, or in addition to, exclude by removal, is exclusion by selecting the desired "correct", or most likely correct, intensity peaks, but such selection implicitly involves exclusion of the non-selected intensity peaks.

Said certain extent may be fulfilled, or said predefined one or more first criteria may be predefined to be fulfilled, when the intensity peak characteristics between the first and second image data differ more than would be the case, or is expected, if the intensity peak characteristics resulted from imaged direct, and possibly also diffuse, reflections from the object points. An additional or alternative way to explain this is that said certain extent may be fulfilled, or the one or more first criteria may be predefined to be fulfilled, for one or more intensity peak characteristics differences that are significative, or indicative, for intensity peaks caused by unwanted reflections, such as specular reflections.

Object points imaged by both first and second imaging implies that same object points are imaged twice. As used herein and in this context, object points are considered, or regarded, the same if they are the exact same object point or if they, according to one or more second predefined criteria, are so close to each other that they are considered the same. In the case of two different cameras involved in the imaging, the exact same object points can be imaged at the same time by respective camera in the first and second imaging by for example synchronized imaging. In this case, as should be realized, the resulting respective image data can easily concern light reflected from same object points and the reflected light from the same illumination. In the case of two different illuminations and one camera, the first and second imaging must be with some time difference in between. However, an object point may be regarded the same as another closely or directly neighboring object point if it is close enough according to said one or more second predefined criteria that thus should ensure that the points are not too distant from each other. What this is and what the second predefined criteria exactly may be in practice, for example in real world coordinates, may vary between different applications, imaging system and setups thereof as realized by the skilled person. For example, assume there is a certain scan, or imaging, rate used for the 3D imaging by light triangulation to capture closest neighboring object points. That is, there will be a certain time corresponding to the scan rate between subsequent images with image data taken by the camera and used for the 3D imaging. During this time the object and/or the light has/have typically moved in relation to each other a certain distance, say b mm, in the scan direction (such as in an y-direction in real world coordinate system as in examples herein). For example, this may be due to that a conveyor belt the object is placed on has moved the object relative to the light, such as through a light plane. In other words, in the scan direction in the real-world coordinates, object points have moved say a resolution distance b mm between the images.

The system, just as any conventional imaging system based on light triangulation, is usually set up to have a certain predetermined resolution in the scan direction and for 3D images in the corresponding dimension. This resolution is available and can thus be considered a suitable or at least acceptable resolution for the application regarding imaging of different but neighboring object points for the 3D imaging. Hence, said resolution distance is available as well. It is realized that to be considered the same object point in two different subsequent images according to the first and second imaging, the object points must be closer to each other than said resolution distance, for example closer to each other than b mm. It is reasonable that to be considered the same object point as another neighboring object point, the object points should be closer to each other than half this distance, such as closer than b/2 mm.

In practice and in implementation of embodiments herein, it will for the first and second imaging typically be desirable to take images as close after each other as possible to minimize the change in distance between images when the aim is to image object points so close that they regarded the same. In most practical situations a camera used in a conventional 3D imaging system based on light triangulation can be operated to take images so fast after each other that object points have moved a distance much less than half of said distance, for example much less b/2 mm. In practice it will thus typically be a matter of, for each image in the "scan" of different object points, to take two (or more) images as fast as possible after each other, whereby images can be regarded to image the same object points.

The principle discussed above for object points to be regarded the same can of course also be applied for said embodiments with two or more cameras, whereby the first and second imaging could be applied with some time offset and the object points still be regarded the same. However, for these embodiments there is typically no problem to achieve almost perfect synchronization with simultaneous first and second imaging, and thereby no meaning to use or accept time difference between the first and second imaging.

Hence, in some embodiments of the method discussed above in relation to FIG. 8, respective object point imaged at least twice by said first and second imaging involves different object points but that are within a predefined distance from each other and thereby regarded the same. Said predefined distance is preferably less than half of a distance according to a 3D imaging resolution provided by the imaging system in a scan direction used for scanning the object by the imaging system.

The principle discussed for object points to be regarded the same may be of interest to apply, or at least be considered to apply, particularly for said embodiments where the first and second illuminations are provided in first and second light planes, respectively, that geometrically are the same plane or parallel planes.

Some deviation from parallel planes may be acceptable for embodiments with parallel planes, as should be realized by the skilled person, as long as the first and second imaging are able to image object points regarded the same. There may thus be deviation from same or parallel planes as long as the first and second imaging when imaging object points twice does not involve object points farther apart than said predefined distance.

Moreover, as already discussed to some extent in connection with examples above, it may be noted that too big differences in view angle or illumination direction may not be desirable since if the difference is too great, it may be difficult to illuminate and/or view same object points for all object points desirable to image in the first and second imaging, although this is of course also depending on the shape etc. of the object being imaged. In principle, embodiments herein will have some effect as long as the object points regarded same are illuminated and imaged by first and second illumination and imaging. However, too small difference is also not desirable since non or very small differences means that that there may be insufficient difference from specular reflections in the first and second imaging, which may make it more difficult than necessary to find differences in the intensity peak characteristics.

Figure 9A:
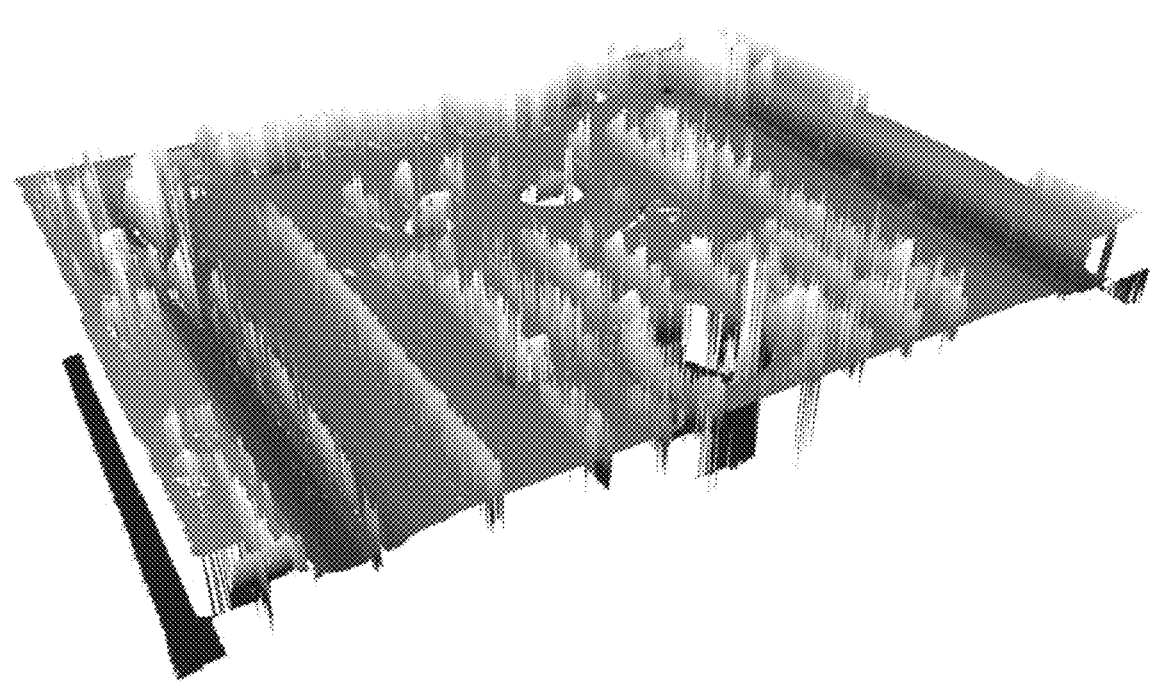
FIGS. 9A-B shows a snapshots of real world 3D images for comparison, where
Figure 9B:
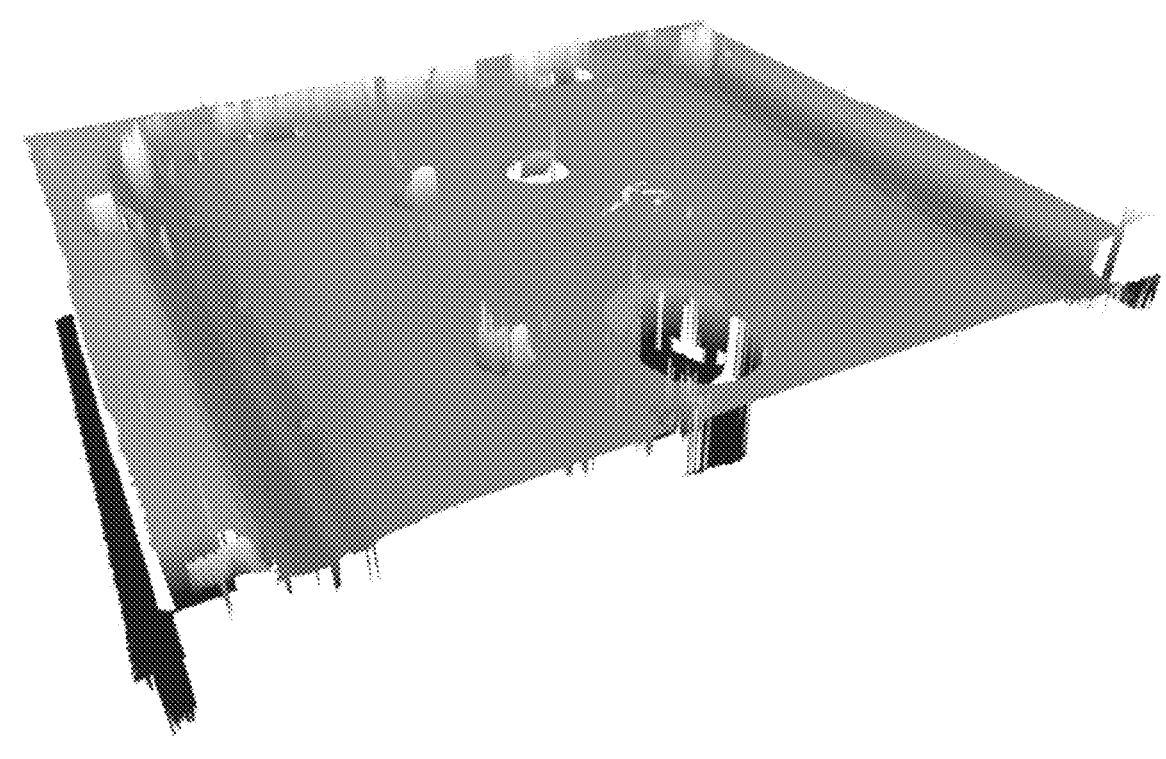

FIGS. 9A-B show examples from reality, the same image as in FIG. 3 is in FIG. 9A, while FIG. 9B shows result after embodiments herein have been applied for 3D imaging of the same object, said Aluminum mold for a mobile phone shell. As can be seen, a large number of the artifacts seen as "spikes" in FIG. 9A have been removed thanks to embodiments herein.

More particularly, embodiments herein have been performed using image data from an imaging system, similar as the imaging system 505$a$ in FIG. 5A, and that has been used to scan and image the circuit board and with exclusion of intensity peak data for "incorrect" intensity peaks in accordance with embodiments herein. Thereafter a 3D image has been formed based on remaining intensity peak data and a snapshot of the 3D image is shown in FIG. 9B. FIG. 9A shows a corresponding snapshot view but when image data from a conventional imaging system has been used for the 3D imaging and without application of embodiments herein.

Figure 10:
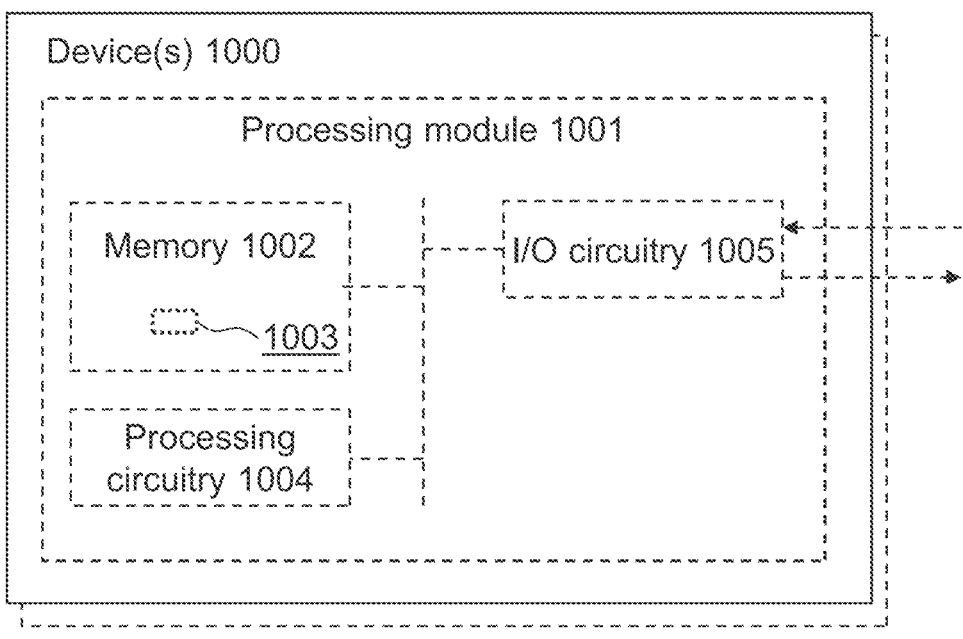
FIG. 10 is a schematic block diagram for illustrating embodiments of one or more devices.

FIG. 10 is a schematic block diagram for illustrating embodiments of one or more devices 1000, i.e. device(s) 1000, that may correspond to devices(s) already mentioned in the above for performing embodiments herein, such as for performing the method and/or actions described above in relation to FIG. 8.

The device(s) 1000 may e.g. correspond to any imaging system 505, computing device 533 and/or camera 530, or suitable devices comprised in and/or forming any imaging system 500, or one or more computing devices remote and separate from the involved imaging system. For example computing device(s) operating on output from any imaging system 500. As realized by the skilled person, some embodiments of the method comprise actions that may be performed distributed by multiple devices configured to perform the actions. It should also be realized that the device(s) 1000 performing the method according to some embodiment may do so at some later occasion than when any imaging system 500 was operated and for example provided the first and second image data. Hence, the method may be performed by device(s) that are remote in time and space from the imaging system and the imaging as such. Output from the imaging system may for example be uploaded to a server or computer cloud comprising computing device(s) configured to perform the method, or from where computing device(s) for performing the method obtains the image data. However, it is typically preferred with a device configured to perform the method as part of and/or in connection with the involved imaging system and the imaging since this enables faster execution and that less image data has to be temporarily stored and/or transferred longer distances. Hence, it may be preferred that the device(s) 1000 is/are any camera 530 and/or computing device 533, or, in other words, that any camera 530 and/or computing device 533 as exemplified herein is/are configured to carry out the method.

The schematic block diagram is for illustrating embodiments regarding how the device(s) 1000 may be configured to perform the method and actions discussed above in relation to FIGS. 8A-B. Hence, the device(s) 1000 is forming image data for use in 3D imaging of an object. The image data coming from an imaging system as described for the method, such as any of said imaging systems 505.

The device(s) 1000 may comprise processing module(s) 1001, such as processing means, one or more hardware modules, including e.g. one or more processing circuits, circuitry, such as processors, and/or one or more software modules for performing said method and/or actions.

The device(s) 1000 may further comprise memory/ies 1002 that may comprise, such as contain or store, computer program(s) 1003. The computer program(s) 1003 comprises 'instructions' or 'code' directly or indirectly executable by the device(s) 1000, respectively, to perform said method and/or actions. The memory/ies 1002 may comprise one or more memory units and may further be arranged to store data, such as configurations, data and/or values, involved in or for performing functions and actions of embodiments herein.

Moreover, respective device 1000 may comprise processing circuitry 1004 involved in processing and e.g. encoding data, as exemplifying hardware module(s) and may comprise or correspond to one or more processors or processing circuits. The processing module(s) 1001 may comprise, e.g. 'be embodied in the form of' or 'realized by' such processing circuitry 1004. In these embodiments, the memory 1002 may comprise the computer program(s) 1003 respectively executable by processing circuitry 1004, whereby respective device 1000 is operative, or configured, to perform said method and/or actions thereof.

Typically the device(s) 1000, e.g. the processing module(s) 1001, comprises an Input/Output (I/O) module(s) 1005, configured to be involved in, e.g. by performing, any communication to and/or from other units and/or devices, such as sending and/or receiving information to and/or from other devices. The I/O module(s) 1005 may be exemplified by obtaining, e.g. receiving, module(s) and/or providing, e.g. sending, module(s), when applicable.

Further, in some embodiments, the device(s) 1000, e.g. the processing module(s) 901, comprises one or more of obtaining module(s), forming module(s), performing modules(s), finding module(s), transforming module(s), excluding module(s), determining module(s), as exemplifying hardware and/or software module(s) for carrying out actions of embodiments herein. These modules may be fully or partly implemented by processing circuitry 1004.

Hence:

The device(s) 1000, and/or the processing module(s) 1001, and/or processing circuitry 1004, and/or the I/O module(s) 1005, and/or the obtaining module(s), and/or one or more of the performing module(s), finding module(s), transforming module(s), is/are operative, or configured, to, obtain said first and second image data The device(s) 1000, and/or the processing module(s) 1001, and/or processing circuitry 1004, and/or the I/O module(s) 1005, and/or the forming module(s), and/or one or more of the excluding module(s), determining module(s), is/are operative, or configured, to, form said image data for use in the 3D imaging of the object based on said obtained first and second image data.

Figure 11:
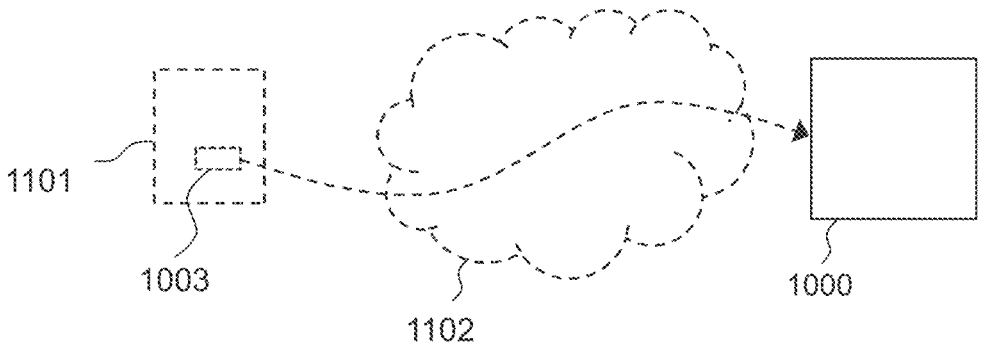
FIG. 11 is a schematic drawing illustrating some embodiments relating to the computer program(s) and carriers thereof.

FIG. 11 is a schematic drawing illustrating some embodiments relating to the computer program(s) 1003 and carriers thereof to cause said device(s) 1000 discussed above to perform said method and actions.

The computer program(s) 1003 comprises instructions that when executed by processing circuitry 1004 and/or the processing module(s) 1001, cause the device(s) 1000 to perform as described above. In some embodiments there is provided one or more carriers, that is carrier(s), or more specifically data carrier(s), such as computer program product(s), comprising the computer program(s). Respective carrier(s) may be one of an electronic signal, an optical signal, a radio signal, and a computer readable storage medium, e.g. a computer readable storage medium 1101 as schematically illustrated in the figure. The computer program(s) 1003 may thus be stored on the computer readable storage medium 1101. By carrier may be excluded a transitory, propagating signal and the data carrier may correspondingly be named non-transitory data carrier. Non-limiting examples of the data carrier being a computer readable storage medium is a memory card or a memory stick, a disc storage medium or a mass storage device that typically is based on hard drive(s) or Solid State Drive(s) (SSD). The computer readable storage medium 1101 may be used for storing data accessible over a computer network 1102, e.g. the Internet or a Local Area Network (LAN). The computer program(s) 1003 may furthermore be provided as pure computer program(s) or comprised in a file or files. The file or files may be stored on computer readable storage medium 1001 and for example be available through download, for example over the computer network 1102 as indicated in the figure, such as via a server. The server may be a web or File Transfer Protocol (FTP) server, or similar. The file or files may be executable files for direct or indirect download to and execution on said device(s) to make it perform as described above, e.g. by execution by processing circuitry 1004. The file or files may also or alternatively be for intermediate download and compilation involving the same or another processor(s) to make them executable before further download and execution causing said device(s) 1000 to perform as described above.

Note that any processing module(s) and circuit(s) mentioned in the foregoing may be implemented as a software and/or hardware module, e.g. in existing hardware and/or as an Application Specific Integrated Circuit (ASIC), a Field-Programmable Gate Array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analogue and digital circuits, and/or one or more processors configured with software and/or firmware, e.g. stored in memory, that, when executed by the one or more processors may make the device(s), sensor(s) etc. to be configured to and/or to perform the above-described methods and actions.

Identification by any identifier herein may be implicit or explicit. The identification may be unique in a certain context, e.g. for a certain computer program or program provider.

As used herein, the term "memory" may refer to a data memory for storing digital information, typically a hard disk, a magnetic storage, medium, a portable computer diskette or disc, flash memory, Random Access Memory (RAM) or the like. Furthermore, the memory may be an internal register memory of a processor.

Also note that any enumerating terminology such as first device, second device, first surface, second surface, etc., should as such be considered non-limiting and the terminology as such does not imply a certain hierarchical relation. Without any explicit information in the contrary, naming by enumeration should be considered merely a way of accomplishing different names.

As used herein, the expression "configured to" may mean that a processing circuit is configured to, or adapted to, by means of software or hardware configuration, perform one or more of the actions described herein.

As used herein, the terms "number" or "value" may refer to any kind of digit, such as binary, real, imaginary or rational number or the like. Moreover, "number" or "value" may be one or more characters, such as a letter or a string of letters. Also, "number" or "value" may be represented by a bit string.

As used herein, the expression "may" and "in some embodiments" has typically been used to indicate that the features described may be combined with any other embodiment disclosed herein.

In the drawings, features that may be present in only some embodiments are typically drawn using dotted or dashed lines.

When using the word "comprise" or "comprising" it shall be interpreted as non-limiting, i.e. meaning "consist at least of".

The embodiments herein are not limited to the above described embodiments. Various alternatives, modifications and equivalents may be used. Therefore, the above embodiments should not be taken as limiting the scope of the present disclosure, which is defined by the appending claims.

The invention claimed is:

1. Method for forming image data for use in 3D imaging of an object (520), wherein said image data are from an imaging system (505) based on light triangulation for 3D imaging of the object (520), said imaging system (505) comprising at least one camera (530) and at least one light source (510) for provision of one or more illuminations (511) in one or more light planes that geometrically correspond to the same plane or parallel planes, and wherein said imaging system (505) and said at least one camera (530) are configured to image object points of the object (520) at least twice, according to a first imaging and second imaging, during illumination of the object points by said one or more illuminations and in accordance with the light triangulation, wherein said first imaging and second imaging differ from each other in how specular reflections caused by said one or more illuminations are being imaged; wherein the method comprises:

obtaining (801) first image data, comprising at least positions of intensity peaks resulting from said first imaging of object points by the imaging system (505), and second image data, comprising at least positions of intensity peaks resulting from said second imaging of the object points by the imaging system (505), wherein said first and second image data correspond to first and second profile images (670), respectively, with common mapping to real world coordinates for intensity peaks (682, 683) caused by direct reflections from the object (520) in accordance with the light triangulation, and forming (802) said image data for use in the 3D imaging of the object (520) based on said obtained first and second image data, wherein said forming excludes intensity peak data that for a respective object point of said object points imaged twice have intensity peak characteristics that differ, or differ more than a certain extent, between the first and second image data.

2. The method as claimed in claim 1, wherein said one or more illuminations comprises a first illumination for illuminating the object points during the first imaging and a different, second, illumination for illuminating the image points during the second imaging, whereby specular reflections caused by said different illuminations will differ and be imaged differently by the first and second imaging.

3. The method as claimed in claim 2, wherein said first and second illumination differ from each other by having different illumination directions in said light planes.

4. The method as claimed in claim 1, wherein said at least one camera (530) is operative with different camera view angles for imaging of the object (520), wherein the first and second imaging differ from each other by use of said different camera view angles, whereby specular reflections caused by said different illuminations will be imaged differently by the first and second imaging.

5. The method as claimed in claim 1, wherein there is at least one common direction in said first and second profile images where it, per parallel pixel line in this direction of respective profile image, is expected at most one intensity peak caused by reflections from the object in accordance with the light triangulation, and wherein said intensity peak characteristics difference is based on comparison between correspondingly positioned such pixel lines.

6. The method as claimed in claim 5, wherein the intensity peak characteristics comprise intensity peak position, and wherein said intensity peak characteristics difference is based on comparison between intensity peak positions of said corresponding pixel lines.

7. The method as claimed in claim 1, wherein the peak characteristics comprise peak position and there is exclusion of intensity peak data for an intensity peak in a peak position according to the first or second image data if the other first or second image data lack an intensity peak in corresponding peak position.

8. The method as claimed in claim 1, wherein said intensity peak characteristics that differ between the first and second image data involve intensity peak characteristics of intensity peaks having corresponding peak positions in the first and second image data.

9. The method as claimed in claim 8, wherein said intensity peak characteristics comprise one or more of intensity peak height and/or intensity peak width and there is exclusion of intensity peak image data for intensity peaks having corresponding peak positions in the first and second image based on difference in intensity peak heights and/or intensity peak widths for these intensity peaks.

10. The method as claimed in claim 1, wherein said forming of image data further comprises determination of image data for use in the 3D imaging of the object, wherein the determination comprises, for intensity peaks in corresponding peak positions: to select the intensity peak data from the first or second image data with the lowest intensity peak height, or to select intensity peak data from predetermined one of the first or second image data, or to combine intensity peak data from the first or second image data.

11. The method as claimed in claim 1, wherein respective object point imaged at least twice by said first and second imaging involves different object points but that are within a predefined distance from each other and thereby regarded the same.

12. The method as claimed in claim 11, wherein said predefined distance is less than half of a distance according to a 3D imaging resolution provided by the imaging system (505) in a scan direction used for scanning the object (520) by the imaging system (505).

13. One or more devices ( ) for forming image data for use in 3D imaging of an object (520), wherein said image data are from an imaging system (505) based on light triangulation for 3D imaging of the object (520), said imaging system (505) comprising at least one camera (530) and at least one light source (510) for provision of one or more illuminations (511) in one or more light planes that geometrically correspond to the same plane or parallel planes, and wherein said imaging system (505) and said at least one camera (530) are configured to image object points of the object (520) at least twice, according to a first imaging and second imaging, during illumination of the object points by said one or more illuminations and in accordance with the light triangulation, wherein said first imaging and second imaging differ from each other in how specular reflections caused by said one or more illuminations are being imaged; wherein said one or more devices are configured to:

obtain first image data, comprising at least positions of intensity peaks resulting from said first imaging of object points by the imaging system (505), and second image data, comprising at least positions of intensity peaks resulting from said second imaging of the object points by the imaging system (505), wherein said first and second image data correspond to first and second profile images (670), respectively, with common mapping to real world coordinates for intensity peaks (682, 683) caused by direct reflections from the object (520) in accordance with the light triangulation, and form said image data for use in the 3D imaging of the object (520) based on said obtained first and second image data, wherein said forming excludes intensity peak data that for a respective object point of said object points imaged twice have intensity peak characteristics that differ, or differ more than a certain extent, between the first and second image data.

14. One or more computer programs (1003) stored on a non-transitory storage medium comprising instructions that when executed by one or more processors causes said one or more devices according to claim 13 to perform the method according to claim 1.

* * * * *